United States Patent [19]

Mohri et al.

[11] Patent Number: 5,384,957
[45] Date of Patent: Jan. 31, 1995

[54] METHOD FOR PRODUCING A MAGNET ROLL

[75] Inventors: Fumihito Mohri; Hideko Arai, both of Shiga; Yoshio Sakata, Kanagawa, all of Japan

[73] Assignee: Kanegafuchi Kagaka Kogyo Kabushiki Kaisha, Osaka, Japan

[21] Appl. No.: 994,596

[22] Filed: Dec. 21, 1992

[30] Foreign Application Priority Data

Dec. 25, 1991 [JP] Japan .................. 3-357864
Feb. 28, 1992 [JP] Japan .................. 4-079217
Mar. 12, 1992 [JP] Japan .................. 4-089979
Mar. 24, 1992 [JP] Japan .................. 4-098642
Apr. 9, 1992 [JP] Japan .................. 4-117919

[51] Int. Cl.$^6$ ............................................. B23P 15/00
[52] U.S. Cl. ..................................... 29/895.32; 492/8
[58] Field of Search ................... 29/895.32, 895; 492/8

[56] References Cited

U.S. PATENT DOCUMENTS

| | | | |
|---|---|---|---|
| 3,149,403 | 9/1964 | Aurich et al. | 492/8 |
| 4,517,719 | 5/1985 | Okumura et al. | 492/8 |
| 4,640,808 | 2/1987 | Okumura et al. | 492/8 |

FOREIGN PATENT DOCUMENTS

| | | | |
|---|---|---|---|
| 60-059377 | 8/1985 | Japan . | |
| 60-182710 | 9/1985 | Japan . | |
| 60-196919 | 10/1985 | Japan . | |
| 61-29874 | 2/1986 | Japan . | |
| 61-154016 | 11/1986 | Japan . | |
| 1247004 | 11/1986 | Japan | 29/895.32 |
| 61-168212 | 12/1986 | Japan . | |
| 62-273707 | 11/1987 | Japan . | |
| 62-273708 | 5/1988 | Japan . | |
| 63-182803 | 7/1988 | Japan . | |
| 1228117 | 9/1989 | Japan | 492/8 |
| 2-222110 | 11/1990 | Japan . | |

OTHER PUBLICATIONS

Patent Abstracts of Japan, vol. 11, No. 198 (E-519) Jun. 25, 1987.
Patent Abstracts of Japan, vol. 13, No. 555 (M-904) Dec. 11, 1989.
Patent Abstracts of Japan, vol. 10, No. 58 (E-386) Mar. 7, 1986.
Patent Abstracts of Japan, vol. 12, No. 150 (E-606) May 10, 1988.

*Primary Examiner*—Irene Cuda
*Attorney, Agent, or Firm*—Armstrong, Westerman, Hattori, McLeland & Naughton

[57] ABSTRACT

A method of producing a magnet roll in which a magnetic property comparable to that obtained by an injection molding can be obtained in spite of an extrusion molding. According to a first embodiment, the yoke width of the magnetic-field extrusion die is varied along an extrusion direction. According to a second embodiment, a pipe filled with resin bonded magnet material is used as a shaft. According to a third embodiment, a shaft having a groove which is filled with magnet is used. According to a fourth embodiment, a shaft provided with surface magnetic charge is used. According to a fifth embodiment, a magnetized region of a shaft is set to be shorter than the length of a main magnet. According to a sixth embodiment, an extruded matter is moved while stored in a sizing metal mold having a magnetic circuit structure. According to a seventh embodiment, a sizing metal mold for storing an extruded matter therein is installed into a heating device and a cooling device equipped with a magnetic circuit structure while storing an extruded matter therein. According to an eighth embodiment, a preliminary magnetization is carried out with magnetic poles whose number is smaller than a finally-required number of magnetic poles, and then a re-magnetization is carried out with the finally-required number of magnetic poles.

6 Claims, 34 Drawing Sheets

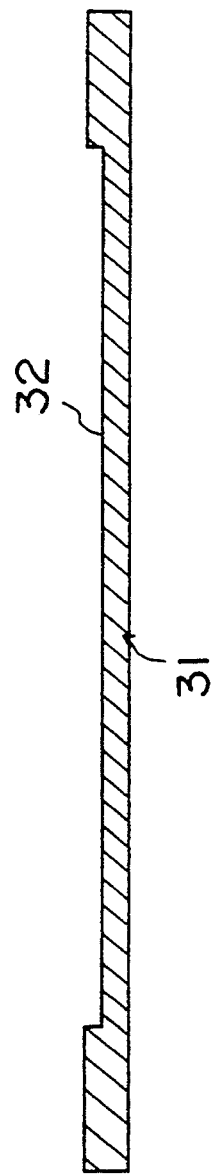
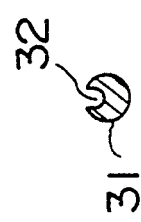

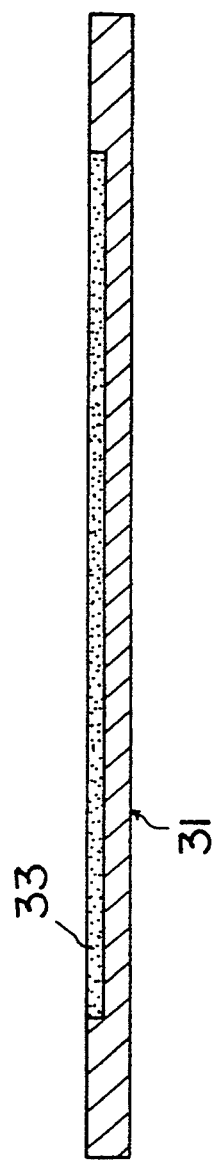
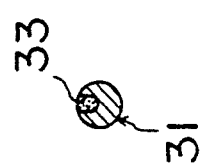
Fig.20(a)
Fig.20(b)

METHOD FOR PRODUCING A MAGNET ROLL

BACKGROUND OF THE INVENTION

1. Field of the Invention

This invention relates to a magnet roll for use in a developing machine using an electrophotographic technique such as a copying machine, a facsimile, a laser beam printer (LBP) or the like and a cleaning machine, and a method for producing the same.

2. Description of the Related Art

A magnet roll has been broadly utilized in a developing machine using an electrophotographic system such as a copying machine, a facsimile or the like. The magnet roll has a function of picking up developing agent from a developing agent box and delivering the pick-up developing agent to a photoreceptor. FIGS. 1 and 2 schematically show the construction of an embodiment of the magnet roll as described above. As shown in FIGS. 1 and 2, a metal sleeve 2 is rotatably provided around a magnet roll 1 to form a developing cylinder 3, and the developing cylinder 3 is disposed so as to confront a photosensitive drum 4. The delivering operation of the developing agent by the magnet roll 1 is performed with the assistance of plural magnetic poles which are magnetized on the surface of the magnet roll, and the intensity of magnetic force (surface magnetic flux density) and magnetic pattern of each magnetic pole is beforehand set in accordance with the role to be performed by the magnetic pole.

The following examples of magnet rolls have been known as a conventional magnet roll 1. One example is a magnet roll as shown in FIG. 3(I) comprising a cylindrical magnet body 5 which is formed by conducting an extrusion molding on resin bonded magnetic material, and a metal shaft 6 inserted into a hollow center of the cylindrical magnet body 5 over its whole longitudinal body. Another example is a magnet roll as shown in FIG. 3(II) comprising a single body having both end shaft portions 7 which are integrally formed using no metal shaft by conducting an injection molding on resin bonded magnet material. A third example is a magnet roll as shown in FIG. 3(III) comprising a solid cylindrical magnet body 9 and short shaft rods 8 inserted into both end portions of the magnet body 9.

The magnet rolls as described above have been generally produced through the following processes, that is, I) a molding process, II) a shaft-inserting process, III) a sizing process, IV) a process for demagnetizing magnets (hereinafter referred to as "demagnetizing process"), and V) a process for re-magnetizing magnets (hereinafter referred to as "re-magnetizing process").

The details of works of the respective processes are as follows.

I) Molding Process

This process is a process for molding resin bonded magnet material containing magnetic material powder dispersed therein in correspondence to the shape of a magnet roll, and both the extrusion molding process and the injection molding process have been mainly used. The extrusion molding process is mainly used to form a magnet roll having a uniform sectional shape over its whole longitudinal length such as a cylindrical body, a columnar body, etc., while the injection molding process is mainly used to form a magnet roll having its whole body which is integrally formed of resin bonded magnet material so as to contain a shaft portion as shown in FIG. 3(II). The extrusion molding process has better producibility than the injection molding.

The resin bonded magnetic material has a lower magnetic flux density near the surface of a magnet product (hereinafter referred to as "surface magnetic flux density") than a sintered magnet, and thus various devices are made to improve the surface magnetic flux density. Such devices are made in the molding process. For example, in order to allow the resin bonded magnet material to have the maximum surface magnetic flux density when it is magnetized after molding, magnetic particles are beforehand oriented in a predetermined direction in the molding process. As a method of orienting the magnetic particles in a predetermined direction is adopted a "molding in the presence of magnetic field (hereinafter referred to as "magnetic-field molding")" that a magnetic field generator for magnetizing magnet products (hereinafter referred as "magnetizer") is embedded into portion of an extrusion molding die or a metal mold for injection molding which is to be magnetized, and a magnetic field is applied to melted resin bonded magnet material stored in the die or mold by the magnetizer to thereby conduct the focus orientation on the magnetic particles in a predetermined direction.

II) Shaft-Inserting Process

This process is a process for inserting a metal shaft into a cylindrical plastic bonded magnet immediately after molding, and a round bar of iron is used as the shaft.

III) Sizing Process

This process is a process for adjusting the external shape of the molded resin bonded magnet in which the semi-hardened magnetic product is accommodated in the die serving as a magnet roll accommodating space to be subjected to a clamping, so that the external shape of the magnet product is adjusted while it is cooled.

For a shaft-inserting type of magnet roll, the sizing process is performed immediately after the shaft-inserting process is carried out. On the other hand, for a shaft-integral type injection molding magnet roll, the sizing process is performed immediately after the molding process is carried out.

IV) Demagnetizing Process

The magnetic-field molding process, as described above, has a main object of subjecting the magnetic particles of the resin bonded magnet material to the focus orientation, and the surface of the magnet product obtained through the magnetic-field molding process is in a magnetized state. There is a case where the molded produce is subjected to the re-magnetizing process at the next stage with keeping its surface magnetic flux density as it is to thereby magnetize the magnet product superposedly over the surface magnetic flux density. However, in many cases, the magnet product is once demagnetized to erase the surface magnetic flux density which has been provided through the magnetic-field molding process, and then subjected to the re-magnetizing process. As described above, this process is the process for erasing the surface magnetic flux density which is provided in the magnetic-field molding process.

V) Re-magnetizing Process

This process is a process for forming magnetic poles required for the magnet roll in the demagnetized magnet product. The demagnetized magnet product is disposed at a predetermined position in the space surrounded by the magnetizer, and it is magnetized under a magnetic field generated by the magnetizer.

The magnet roll is formed through the series of processes as described above, and the magnet roll thus formed and the producing method therefor have various problems.

Although the extrusion molding has excellent producibility, however, there is a problem in that the orientation of the magnetic particles is degraded. That is, since the resin bonded magnet product contains a lower amount of magnetic material than the sintered magnet product, the magnetic particles are caused to be oriented in a specific direction to obtain high magnetic property. Ordinarily, the particles are so oriented that the whole magnet is magnetized in one direction, for example, in a radial direction. In a manufacturing process of a magnet product with multi-poles which consists of only one permanent magnet body (hereinafter referred to as "one-body magnet with multi-poles"), as described above, in many cases, the focus orientation system (the method that plural magnetic field generating poles are disposed on the inner surface of the die or metal mold and the magnetic particles are oriented in a direction of lines of magnetic flux which are induced by the magnetic field generating poles to thereby provide plural magnetic poles on the peripheral surface of the magnet) has been used to obtain the highest surface magnetic flux density. As shown in FIG. 51, the focus orientation is defined as an orienting method of applying a magnetic field to melted resin bonded magnet material to focus the axis of easy magnetization of magnetic powder in the resin bonded magnet material in the magnetic field direction, and for example, a method of disposing external magnetic poles (N-magnetic pole and S-magnetic pole in FIG. 51) for generating the applied magnetic field for the focus orientation at predetermined positions so as to be confronted to the outer peripheral surface of the melted cylindrical resin bonded magnet M as shown in FIG. 51 to focus the axis of easy magnetization of the magnetic powder in the resin bonded magnet material in the magnetic field, as indicated by an arrow in FIG. 51. As described above, the plastic bonded magnet material is melted with heat and molded while a magnetic field is applied from external positions corresponding to magnetic poles to be formed, and then cooling and solidifying the melted resin bonded magnet material to form the focus-oriented resin bonded magnet.

Further, when the magnet product has a longitudinal body like a magnet roll, it has been known that an extrusion molding in the presence of a magnetic field which can provide uniform surface magnetic flux density in its longitudinal direction and has high producibility can be effectively used as molding means.

However, the orientation is not sufficiently conducted at the inner part of the magnet product because a high-viscosity binder is used in the extrusion molding, and this inclination is remarkable particularly in the focus orientation in which the orientation field is liable to be concentrated on the surface of the magnet product. Therefore, in general, the magnetic property of the resin bonded magnet obtained through the extrusion molding is more degraded than the resin bonded magnet having the same kind of magnetic material powder in the same rate. In view of the foregoing, there has been conventionally required a producing method for a resin bonded magnet having a magnetic property which is comparable to that of resin bonded magnet obtained through the injection molding even though the extrusion molding having more excellent producibility is adopted.

As a second problem, for a magnet roll having small diameter, there occurs a so-called "shaft problem" in that the magnet roll is liable to sag because the shaft has small diameter.

For example, a magnet roll having a small diameter has been recently required in synchronism with the miniaturization of an electronic copying machine, a facsimile and a laser beam printer (LBP). Concretely, a magnet roll having a longitudinal length greater than 220 mm and a diameter less than 13 mm, which is usable for A4 size (210 mm×297 mm), has been required. In addition, a magnet roll having a diameter less than 10 mm has been also required. As the magnet roll becomes thinner as described above, what shaft should be used becomes more important. The reason is as follow.

The main pole (which is defined as the magnetic pole with the maximum flux density) of an ordinary magnet roll is required to have the surface magnetic flux density of between 700 to 1000 gauss. The magnet roll is required to have a magnet volume above a prescribed value to achieve the above level of surface magnetic flux density, and thus the magnet portion is required to have a thickness above a prescribed value. The specific value of the thickness is variable in accordance with the used magnet material, and usually it is above about 3 mm for a bonded magnet formed of hexagonal ferrite which is usually used. Therefore, an extremely slender shaft must be used for a magnet roll having a small diameter. For example, a shaft having a diameter about 3 mm and length about 240 mm must be used for a magnet roll having 10 mm diameter and 220 mm length.

When the diameter of the shaft is reduced to such an extent as described above, a round bar formed of typically used material (soft iron, aluminum alloy, stainless, etc.) is insufficient in strength, and frequently sags during the manufacturing process. On the other hand, use of a special material having high strength greatly increases the cost, and this is unfavorable. Even when quenched material is used, it does not necessarily have sufficient strength. Further, it is frequently bent during a quenching process. When a shaft having a rectangular (substantially square) section is used, some degree of strength can be obtained, but its cost is high. It is adopted as a method of solving the "shaft problem" that shaft portions projecting from both ends of the magnet roll body are also formed integrally with the magnet roll body using the same plastic bonded magnet material. For example, the whole body comprising the shaft portions and the magnet roll body are formed through the injection molding in the presence of a magnetic field into one-body formed of the same magnet material. Through this process, the magnet roll body can be so designed as to have a solid body (usually, a cylindrical body), so that a sufficiently large volume for keeping the surface magnetic flux density to a predetermined level can be ensured for the magnet. In addition, the mechanical strength is sufficient because the magnet roll body has a solid body, and the sagging of the magnet roll is prevented.

However, the injection molding has the following disadvantages. That is, the producibility of the injection molding is low, and thus the reduction of cost is limited. In addition, it is difficult to form the slender bonded magnet so as to have a uniform magnetic property over its longitudinal length. Further, warping frequently occurs, and thus a process for removing the warp is ordinarily required. The extrusion molding has no problem, as described above, in principle, and has high producibility, so that it is very preferable. However, as described above, insofar as a round-bar shaft is used in the extrusion molding, a more slender shaft must be used to prioritize the surface magnetic flux density, and this causes the strength to be insufficient. On the other hand, when the shaft strength is prioritized, the thickness of the magnet portion is reduced, and thus the surface magnetic flux is sacrificed.

In view of the foregoing, a method for producing a magnet roll having a predetermined level of surface magnetic force (surface magnetic flux density) and preventing the sagging of the magnet roll has been required though it is the method of producing a slender magnet roll through the extrusion molding process.

As a third problem, the conventional magnet roll has a problem that an effective range which is usable as a developing region is extremely shorter (smaller) in comparison with the actual length of the magnet roll, and thus it is difficult to promote the miniaturization of the device.

That is, in the conventional magnet roll, the magnetic flux is concentrated at both side portions of the cylindrical or columnar magnet body by a phenomenon in which extremely high surface magnetic flux density appears just near the edge of a magnet, a so-called "edge effect", and there occurs a phenomenon that the intensity of magnetic field at both side portions of the magnet body lift up. Consequently, the region of the magnet body where uniform magnetic flux density can be ensured over the longitudinal direction of the magnet body is narrowed, and thus the magnet portion is so designed as to be longer than the developing region. This causes a problem that the miniaturization of an equipment is obstructed.

As a method of depressing the edge effect has been proposed a method for making a device to the magnetizer. However, in this method, the structure of the magnetizer is complicated because the tip portion of the magnetizer is not flat in structure, so that there occurs a problem that the optimization of the structure of the magnetizer is difficult. In view of the foregoing, there has been required the structure of the magnet roll and the producing method in which the edge effect at the edge portion can be depressed using no complicated magnetizer to ensure a broad region having uniform magnetic properties in its longitudinal direction and thus a broad developing region.

As a fourth problem, the conventional extrusion molding in the presence of a magnetic field has a problem in that the degree of magnetic particle orientation in the resin bonded magnet material is disturbed or lowered due to difference in magnetic field distribution between the inside of the die and the outlet thereof and existence of magnetic Maxwell stress and self-demagnetizing field until the resin bonded magnet material is cooled and solidified.

The extrusion molding process in the presence of a magnetic field has been known as having high producibility and being suitable for producing a longitudinal resin bonded magnet. However, this molding process has an inherent disadvantage in that instantaneous cooling of an extruded matter is impossible, and thus has the following problems (1), (2) and (3):

(1) The extruded matter is deformed by magnetic Maxwell stress from the time when it is discharged from the die until the time when it is cooled and solidified, and thus it is difficult to obtain a magnet product having a desired shape.

(2) Since the magnetic field distribution in the neighborhood of the outlet of the die is different from that inside of the die, the orientation state of the magnetic particles which are oriented in a desired direction by the magnetic field inside of the die is disturbed at the outlet portion of the die, and thus a resin bonded magnet having an unfavorable magnetic pattern is liable to be unintentionally obtained.

(3) The degree of magnetic particle orientation is lowered by the demagnetizing field (self-demagnetizing field), so that the magnetic property is degraded.

These phenomena are remarkable particularly in the process of producing a longitudinal magnet formed with a number of magnetic poles. Therefore, trial-and-error must be carried out many times to develop such products, and it is difficult to produce a magnet roll which has high magnetic property to such an extent as to be matched with a high-quality requirement of an electronic copying machine, a facsimile and an LBP, and is produced in low cost.

As a basic method of solving the above problem, the extruded matter which is extruded from the extrusion die for the magnetic field orientation is cooled and solidified under a magnetic field which does not disturb the orientation (including a process of cooling and solidifying the extruded matter while it is disposed adjacent to or in contact with magnetically soft material such as iron to erase the demagnetizing field), and this method itself has been well-known. The inventors of this application have proposed a method that an endless-shaped magnetically soft material block and/or another permanent magnet block is moved in synchronism with an extruded matter while it is in contact with the extruded matter from the time when the extruded matter is discharged from the extrusion die for magnetic field orientation until the time it is cooled and solidified, as disclosed in Japanese Laid-open Patent Application No. 62-273707. However, this method is unsuitable for the production of a cylindrical magnet which is magnetized so as to have multiple poles.

In another method as disclosed in Japanese Laid-open Patent Application No. 60-182710, the melted resin bonded magnet material is not subjected to the magnetic field orientation in the die, and it is subjected to the magnetic field orientation when it is passed through a sizing mold for both of a cooling and magnetic-field orientation which is disposed at the rear stage of the die. However, in this method, the melted resin bonded magnet material is rapidly cooled and thus its viscosity is increased. Therefore, a problem occurs in that the degree of magnetic particle orientation is not increased irrespective of the application of the magnetic field. In addition, since the sizing mold is left static, the orientation of the magnetic particles is obstructed by friction between the inner wall of the sizing mold and the extrusion. As a result, there occurs another problem that no resin bonded magnet product having a high magnetic property can be obtained.

Accordingly, in many cases, a magnetizing process must be added in a fabricating process after the molding process, and a sufficient magnetic field can not be necessarily obtained by the magnetizing process.

In view of the foregoing, there have been required a method for producing a resin bonded magnet and a producing apparatus suitable for the method in which the degree of magnetic particle orientation of the resin bonded magnet material is prevented from being disturbed or reduced, and a magnetic property comparable with that obtained through the injection molding can be obtained while keeping high producibility obtained through the extrusion molding.

As a fifth problem, the surface magnetic flux density of the magnet roll which is obtained by demagnetizing a magnet product formed through the magnetic-field molding and then remagnetizing it, or by remagnetizing the magnet product thus formed without being demagnetized, does not necessarily have satisfactory mechanical strength.

For example, conventionally, it has been generally adopted that plural magnetic poles are provided to a magnet roll in the peripheral direction thereof, and it has been adopted as a method of reinforcing the magnetic flux density of the magnetic poles that the magnetization is carried out using a magnetizer having yokes whose number is equal to the number of the magnetic poles. For example, as shown in FIG. 50, a pulse current is applied to a coil 93 for magnetizing magnet (hereinafter referred to as "magnetizing coil") which is wound around the side portion of material used for the paths for magnetic flux (hereinafter referred to as "yoke") to generate a magnetic field, and the generated magnetic field is guided to the tip of the yoke to generate a desired magnetic field at a desired position, whereby a magnet roll 94 inserted into the central portion of the magnetizer is magnetized.

However, in a magnet roll having magnetic poles which are alternately arranged in the peripheral direction thereof as shown in FIG. 49, the line of magnetic force from a magnetic pole is passed through the surface portion of a yoke to neighboring magnetic poles which are adjacent to the magnetic pole, so that the magnetic field is generated so as to be concentrated on the surface of the magnet roll, and thus the inner portion of the magnet roll is hardly magnetized. Therefore, the inner portion of the magnet roll is substantially in non-magnetized state, and there is substantially no contribution of the inner portion of the magnet roll to the surface magnetic flux density of the magnet roll, so that in many cases a desired amount of surface magnetic flux density cannot be obtained. There has also been proposed a method wherein when high surface magnetic flux density is required for specific magnetic poles, the magnetization is carried out by the desired number of magnetic poles after a uniform orientation (for example, radial orientation) is conducted in the molding process (Japanese Laid-open Patent Application No. 63-182803). However, this method has a problem in that when the magnetization is performed in a direction perpendicular to the orientation direction, the surface magnetic flux density after magnetization process is excessively reduced, and thus this method is applicable only to a small number of cases.

In view of the foregoing, a concrete re-magnetizing process for providing the magnet roll with high surface magnetic flux density is desired.

This invention has an object to provide means of solving the problems which are inherent to the conventional magnet roll as described above.

SUMMARY OF THE INVENTION

The preferred exemplary embodiment of the invention proposes an extrusion molding in the presence of a magnetic field for obtaining a magnetic property which is comparable to the magnetic property obtained through the injection molding, and specifically discloses the construction of an extrusion die for magnetic field orientation (hereinafter referred to as "magnetic-field extrusion die") which is used in the extrusion molding in the presence of a magnetic field. The first exemplary embodiment has the following construction.

According to the first exemplary embodiment of the invention, the extrusion molding in the presence of a magnetic field for producing a resin bonded magnet uses a magnetic-field extrusion die having a structure in which the sectional shape of a ferromagnetic material portion constituting a surrounding of the land is varied along an extrusion direction and a main pole, which is the pole with the highest surface magnetic flux density, which has a broad tip width at the inlet of the land and a narrow tip width at the outlet of the land.

Here, the tip width of the ferromagnetic material portion means the substantial width of the magnetic portion in consideration of the penetration of the magnetic flux. It is defined in accordance with the tip shape. FIGS. 11(I) to (V) show examples of the definition of the tip width. In the figures, a reference numeral 12 represents a magnetic yoke serving as a ferromagnetic material portion, both sides thereof serving as a non-magnetic material portion (cross section hatching is eliminated), and a reference numeral 3 represents a molding space. A character W represents the tip width. Even when a non-magnetic thin layer is provided on the surface of the magnetic portion, the width of the magnetic portion is defined as the tip width when the magnetic property is unvaried.

According to the above construction, the magnetic field applied to the melted mold material is varied from the inlet of the land to the outlet thereof. Here, if the melted molding material has low viscosity, the magnetic particles are rotated, following the variation in magnetic field distribution in the land, so that the final orientation state is substantially determined by the magnetic field distribution at the outlet of the die and its neighborhood. However, the molding material which will be subjected to the extrusion molding has high viscosity in its melted state, and the extrusion is not conducted limitlessly so that the rotation of the magnetic particles does not follow the variation of the magnetic field distribution thus, the final orientation state reflects the whole of the magnetic field distribution between the inlet and the outlet in the land. The reason why the structure is effective for production of a magnet roll with a higher magnetic flux density is as follows: The distance dependence of the magnetic field depends on the width of the pole tip which generates a magnetic field. A narrow pole tip causes the magnetic field to sharply decrease, and the magnetic field from a wide pole tip decreases gradually. The width of the pole tip near the inlet of the extrusion die for the first invention is wider than the one of the pole tip near the outlet. Hence, the magnetic field near the inlet can penetrate deeply into an inner region of the melted resin bonded magnet. It provides a higher magnetization state in the inner region. Therefore, during the resin bonded magnet is moving toward the outlet, the pole tip width is narrowed. Then the re-orientation of the magnetic particles occurs mainly near the surface of the resin bonded magnet. Thus after the magnet is solidified by cooling, we obtain a columnar or cylindrical resin bonded magnet whose inner region has a higher magnetization state and whose magnetization state near the surface is reflected mainly by the magnetic field which is distributed at the outlet region of the extrusion die. Such a magnet has a higher surface magnetic flux density than the magnet produced with a conventional extrusion die having pole tip width is uniform in the extrusion direction.

The following is the construction of a second embodiment invention proposing the structure of a shaft which is suitably used for a slender magnet roll, keeps sufficient mechanical strength and provides sufficient surface magnetic flux density. According to the second embodiment of the invention, in a magnet roll comprising a shaft and a magnet body formed of resin bonded magnet material which is obtained by dispersing and mixing powder of ferromagnetic particles with the magnetic anisotropy into synthetic resin, the magnet body being disposed around the shaft, the shaft comprises a pipe filled with resin bonded magnet material therein.

Particularly, it is preferable that the pipe is formed of non-magnetic material and both of the magnet material filled into the pipe and the magnet material of the magnet body are formed of mixture material obtained by dispersing hexagonal ferrite into plastic. Further, it is more preferable that the magnet material in the pipe is dipolary magnetized to increase the magnetic force (surface magnetic flux density).

The method for producing the magnet roll having the above structure is characterized by beforehand providing a resin bonded magnet material filled pipe which is obtained by filling the hollow of a pipe having smaller outer diameter than that of the magnet roll with resin bonded magnet material which can be oriented in the presence of magnetic field, and extruding the thus-formed pipe with the melted resin bonded magnet material in the presence of a magnetic field.

It may be adopted as another producing method that a resin bonded magnetic material filled pipe on which magnet poles are formed in the same arrangement as a cylindrical resin bonded magnet product obtained through the extrusion molding in the presence of magnetic field is penetratingly inserted into the cylindrical resin bonded magnet product.

Further, it is also preferably adopted as a producing method that the pipe filled with the dipolary-magnetized resin bonded material is penetratingly inserted into the hollow of the cylindrical resin bonded magnet product formed by the extrusion molding in the presence of magnetic field.

Still further, it is also preferably adopted as another producing method that non-magnetized resin bonded magnet material is filled into the hollow of a pipe, the pipe filled with the resin bonded magnet material is extruded with melted resin bonded magnet material in non-magnet field, and then magnetizing the extrusion to provide a predetermined pattern of surface magnetic flux density.

The following is the reason why the "shaft problem" can be solved by the second embodiment of the invention.

In comparison between a slender round bar and a pipe having larger outer diameter than that of the round bar, in some cases, the pipe has higher mechanical strength against sagging than the round bar (of course, it is dependent on material, outer diameter and thickness). For example, when the thickness is commonly about 1 mm, an aluminum pipe of 240 mm in length and 6 mm in outer diameter is less bendable than a round bar of SS41 (one kind of soft iron) or 240 mm in length and 3 mm in outer diameter.

Since the pipe used in this invention is formed of a non-magnetic material, by filling the resin bonded magnet material into the pipe and orienting the resin bonded magnet material in the presence of magnetic field like the magnet roll body which is disposed on the outer surface of the pipe, it can contribute to improvement of the surface magnetic flux density. This embodiment mainly aims at the application to a slender magnet roll, however, the method of improving the surface magnetic flux density using the resin bonded magnet material filled pipe is not limited to the slender magnet roll, and it may be applied to a magnet roll having a normal diameter to increase the magnetic flux density thereof. Particularly when the magnetic material in the pipe is dipolary magnetized, the magnetic field induced by the dipolary magnetized magnet expands over a farther position than the magnetic field of a multipolary magnetized magnet. Therefore, by adjusting the relative arrangement between the magnetizing direction of the magnetic material in the pipe and the magnetizing direction of the magnet of the magnet roll body, the magnetic force (surface magnetic flux density) can be increased, and the pattern of the surface magnetic flux density can be suitably designed. In this case, an angular interval between an N-pole peak position and an S-pole peak position may be set to 180° (see FIG. 16) or within 180° (see FIG. 17), or the width of the N-pole may be different from that of the S-pole (see FIG. 18). The suitable mode may be selected in accordance with the pole arrangement of the magnet of the magnet roll body and the required surface magnetic flux density. The pole position of the magnet in the pipe is preferably matched with that of the magnet body disposed around the pipe, however, the pole-position matching is not necessarily required if a suitable pattern of surface magnetic flux density can be obtained.

The non-magnetic pipe is magnetically equivalent to "a cavity", so that the surface magnetic flux density when a non-magnetic pipe is provided is more reduced than that when no non-magnetic pipe is provided. However, by suitably selecting the pipe thickness, the reduction of the surface magnetic flux density can be depressed to the extent that no problem occurs in practical use. If a pipe which is formed of soft magnetic body having easy magnetization direction in the thickness direction (radial direction) thereof can be used, this is preferable because the pipe acts as "a magnetization guiding passage for magnetically closely attaching" magnets inside and outside of the pipe to each other, so that the reduction of the surface magnetic flux density can be prevented. However, there has been hitherto found out no material which has the easy magnetization direction in its thickness direction and mechanical strength above predetermined level, and whose price is low. Accordingly, under the present conditions, the non-magnetic material must be used.

The second embodiment using the resin bonded magnet material filled pipe is effective in increasing the magnetic force (surface magnetic flux density) of a specific pole. However, the surface magnetic flux density of the other pole is excessively reduced, so that it is frequently unusable for the magnet roll. Particularly when a magnetic pole having the same magnetic polarity as a magnetic pole whose magnetic force (surface magnetic flux density) is intended to be increased is disposed at the confront position to the magnetic pole (at angular interval of about 180°) or near to the position, the magnetic force (surface magnetic flux density) of the magnetic pole is excessively reduced in some cases. A third embodiment of the invention has an object of solving this problem and has the following construction.

According to the third embodiment, a magnet roll comprising a cylindrical resin bonded magnet formed of mixture material obtained by dispersing ferromagnetic powder having magnetic anisotropy into synthetic resin, and a shaft which is penetratingly inserted into the hollow of the cylindrical resin bonded magnet, the shaft is partially or wholly formed with a groove or cut surface in its longitudinal direction, and a magnet is filled or adhesively secured into the groove or cut surface.

As described above, if the shaft is so designed to have such a large size in diameter that it has sufficient strength, the main magnet of the magnet roll (which is defined as a one-body magnet with multi-poles which mainly contributes to the surface magnet flux density of the magnet roll) must be designed so as to have a small thickness, and thus the magnetic field induced by the magnet is reduced. However, the magnet is secured to the shaft of this invention, so that the shaft itself induces a magnetic field and the reduction in the magnetic field of the main magnet is compensated by the magnetic field induced by the shaft. In addition, since the shaft is not wholly formed of a magnet, the surface magnetic flux density of magnetic poles other than a magnetic pole whose surface magnetic flux density is intended to be increased is prevented from being reduced to the extent that it is practically unusable. As described above, according to this invention, there can be provided a multipole magnetized magnet roll in which the surface magnetic flux density of a specific magnetic pole can be increased using a thick shaft having sufficient strength. In addition, the surface magnetic flux density of the magnetic poles requiring high surface magnetic flux density other than the specific magnetic poles (poles at the confront position or at a near position hereto) is prevented from being excessively reduced.

The "shaft problem" that when a shaft of standard diameter is used for a slender magnet roll, a desired surface magnetic flux density cannot be obtained on the surface of the magnet roll can be solved by a fourth embodiment, and the fourth embodiment has the following construction.

In the second embodiment, the resin bonded magnet material filled pipe is used as the shaft, and in the third resin bonded magnet of the third embodiment is filled into a groove which is formed on the surface of the solid shaft over its longitudinal length. The fourth embodiment has an object of preventing the reduction of the surface magnetic flux density of the magnet roll without particularly devising the shape of the shaft, and it is implemented on the basis of the find-out of a case where a longitudinal magnet body itself is usable as a shaft.

That is, according to this embodiment, in a magnet roll having the structure in that a magnet body formed of resin bonded magnet material which is obtained by dispersing and mixing ferromagnetic powder having magnetic anisotropy into synthetic resin is disposed around a shaft, the shaft comprises a rod member having surfaces magnetic charge.

As described above, if the shaft is so designed as to be thick to the extent that it has sufficient strength, the main magnet which is disposed around the shaft must be so designed as to be small in thickness. In addition, when the conventional normal shaft is used, the reduction of magnetic field of the magnet roll is unavoidable. However, the shaft of this embodiment induces a magnetic field because it has surface magnetic charge, and the reduction of the magnetic field of the main magnet can be compensated for by the magnetic field induced by the shaft. In addition, unlike the method of filling the magnet material into the non-magnetic pipe which has been previously proposed by the same inventors, there is no loss of the magnetic field due to the non-magnetic pipe, and thus higher surface magnetic flux density can be obtained in the magnetic roll of this invention. Therefore, according to this invention, there can be provided a multipolary magnetized magnet roll having high surface magnetic flux density even using a thick shaft having sufficient strength.

A fifth embodiment has an object of providing a magnet roll in which occurrence of an edge effect at the edge portion of the magnet roll can be prevented, and a developing region can be expanded, and it has the following construction:

In order to attain the above object, according to this embodiment, in a magnet roll having the structure that magnet body formed of resin bonded magnet material which is obtained by dispersing and mixing ferromagnetic powder having magnetic anisotropy into synthetic resin is disposed around a shaft, the shaft is characterized by being provided with surface magnetic charge on a region shorter than the length of the magnet body which is disposed around the shaft.

According to the construction of this invention, the magnetic flux density distribution at each portion in the longitudinal direction of the magnet roll corresponds to the sum of the magnetic flux density distribution of the magnet body (main magnet) disposed around the shaft and the magnetic flux density distribution of the shaft. That is, only the magnetic flux density distribution at the region of the shaft which is provided with the surface magnetic charge is increased, so that the edge effect at the edge portion is substantially moderated. Therefore, the difference between the length of the main magnet and the substantially effective length can be reduced to expand a region on which a developing operation can be carried out.

A sixth embodiment of the invention has an object of solving the problem that the magnetic property of the magnet roll is reduced due to the phenomenon that the degree of magnetic particle orientation is reduced due to the difference in magnetic field distribution between the inside of the die and the outlet of the die or due to existence of magnetic Maxwell stress and self-demagnetizing field until the resin bonded magnet material is cooled and solidified. The sixth embodiment of the invention which can solve such a fatal problem in the extrusion molding in the presence of magnetic field has the following construction.

This embodiment is characterized by including a process including the step of press-fitting resin bonded magnet material obtained by dispersing and mixing ferromagnetic material powder having magnetic anisotropy into synthetic resin in the die in a state where the resin bonded magnet material is heated and melted and conducting the magnetic-field orientation on the resin bonded magnet material, a step of accommodating the extruded matter from the die into a sizing metal mold having a magnetic circuit structure and moving the extruded matter in a delivering direction together with the sizing metal mold in a state where the extruded matter is accommodated in the sizing metal mold, a step of cutting the extruded matter at desired length and separating the cut extruded matter from the sizing metal mold, and a step of returning the sizing metal mold to a stand-by position while cooling the sizing metal mold after the separation process, the series of steps as described above being repeated.

According to this embodiment, the phenomena that the shape of the extruded matter is deformed and the orientation of the magnetic particles in the extrusion is disturbed until the extruded matter is cooled and solidified can be prevented. The reason is as follows.

The extruded matter is cooled and solidified while sandwiched by the sizing metal mold, and thus the deformation of the extruded matter during the cooling process is prevented. Further, since the sizing metal mold is provided with magnetic poles constituting a magnetic circuit, there occurs no deterioration in the orientation state of the extruded matter. Even if the orientation state of the extruded matter is deteriorated immediately before the extruded matter is inserted into the sizing metal mold, the deterioration of the orientation state is remedied in the sizing metal mold. In addition, since the sizing metal mold is moved in the delivering direction while accommodating the extruded matter therein, no friction occurs between the wall of the metal mold and the extruded matter, and thus the orientation state of the extruded matter is not disturbed.

Like the sixth embodiment, a seventh embodiment has an object of solving the problem that the magnetic property of the magnet roll is reduced due to the phenomenon that the degree of magnetic particle orientation is reduced due to the difference in magnetic field distribution between the inside of the die and the outlet of the die or due to existence of magnetic Maxwell stress and self-demagnetizing field until the resin bonded magnet material is cooled and solidified. According to the seventh embodiment, the above problem is solved by a method different from the sixth embodiment. The following is the construction of the seventh embodiment.

In order to attain the above object, in a process of producing a resin bonded magnet, magnetic raw material obtained by dispersing and mixing ferromagnetic powder having magnetic anisotropy into thermoplastic resin is subjected to the extrusion molding in the presence of a magnetic field, heated under a magnetic field in a sizing metal mold having yuke structure which has substantially the same pole arrangement as the extrusion die, and then is cooled together with the metal mold in the presence of a magnetic field.

According to this construction, the magnetic particles whose orientation has been fixed while being disturbed in the extrusion molding in the presence of a magnetic field are re-oriented in the heating process under a magnetic field, and then cooled and solidified while keeping the re-oriented state. Consequently, a resin bonded magnet product is produced which has a high degree of orientation at the surface portion thereof, where a function inherent to the magnet is substantially developed.

That is, the resin bonded magnet which has been once oriented in the extrusion molding in the presence of a magnetic field is installed into the heating apparatus while sandwiched by the sizing metal mold having the yoke structure, and the resin at the surface portion is melted by heat of the heating apparatus. The magnetic particles at the surface portion of the melted resin bonded magnet material are in a movable state, and thus re-oriented by an applied magnetic field. Thereafter, the resin bonded magnet material is installed together with the sizing metal mold into the cooling apparatus having a built-in magnetic circuit, so that the re-oriented magnetic particles in the resin bonded magnet material are fixed without being disturbed. According to this process, the orientation state of the magnetic particles at the surface portion which are disturbed in the extrusion molding is improved, and a magnet roll having high surface magnetic flux density can be obtained.

The product obtained through the extrusion molding in the first to seventh embodiments is demagnetized and then re-magnetized, or re-magnetized without being demagnetized. An eighth embodiment discloses a magnetizing method of reinforcing the surface magnetic flux density on the surface magnetic pole of the magnet roll formed by the above re-magnetizing process. The following is the construction of the eighth embodiment.

The magnetizing method for a magnet roll according to the eighth embodiment is a method of beforehand performing magnetization using magnetic poles whose number is smaller than the desired number of magnetic poles, and then performing re-magnetization using the desired number of magnetic poles.

According to this construction, the magnetic field is applied in a concentrated manner on the main pole, the pole with the highest magnetic field, in a first magnetizing process to perform magnetization to the inner part of the magnet roll, and then the re-magnetization is performed using the desired number of magnetic poles. In this case, since the number of magnetic poles used in this re-magnetizing process is larger than the number of magnetic poles used in the first magnetizing process and the angular interval between the magnetic poles is small, the line of magnetic force passes through the surface portion of the magnet roll to the neighboring magnetic pole, and the magnetic field barely extends to the inner portion of the magnet roll. Therefore, the desired number of magnetic poles can be generated at the surface portion of the magnet roll while keeping the magnetization state in the inner portion as is. Therefore, the main pole of the desired number of magnetic poles thus obtained is enabled to be reinforced by the orientation state of the inner portion which has been magnetized in the first magnetizing process.

Figure 1:
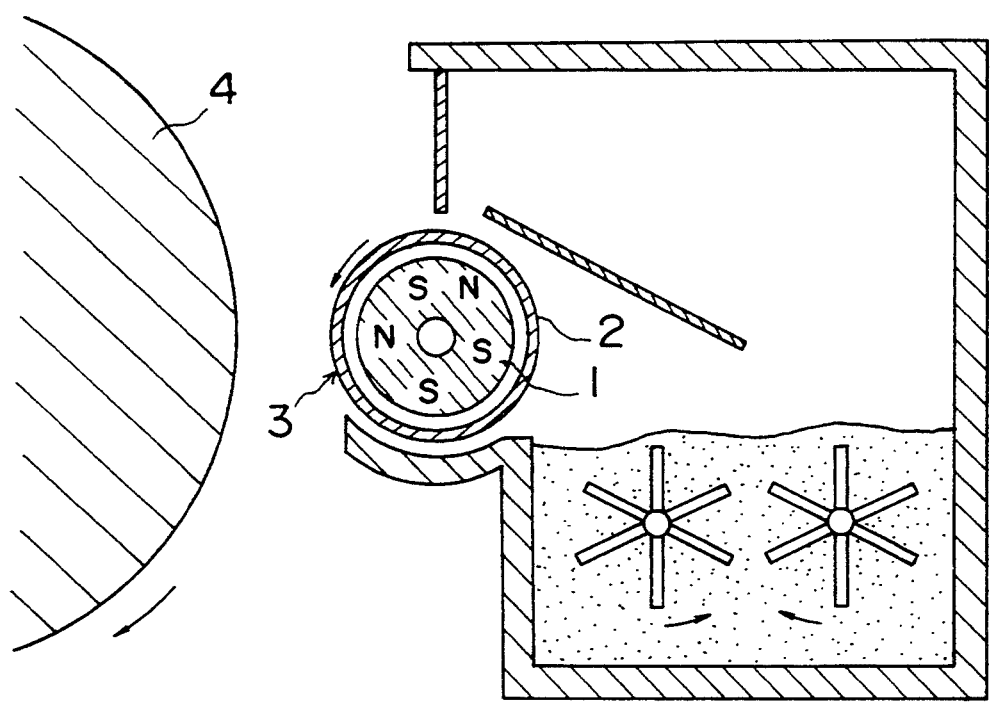
FIG. 1 is a cross-sectional view of a developing apparatus in which a magnet roll is installed.
Figure 2:
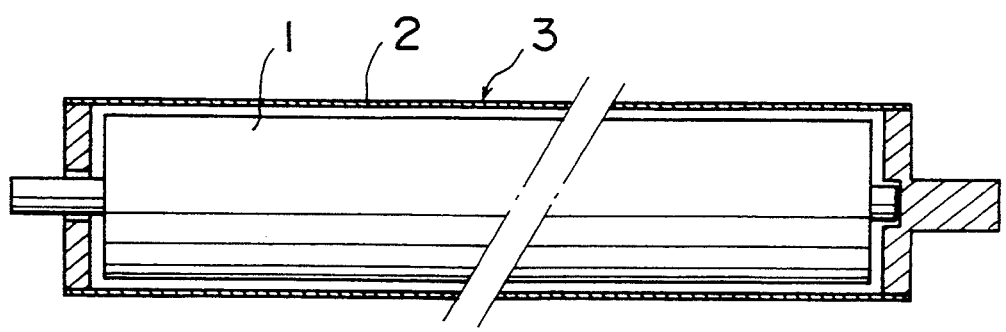
FIG. 2 is a cross-sectional view of the construction of a developing cylinder in which a magnet roll is installed.
Figure 3A:
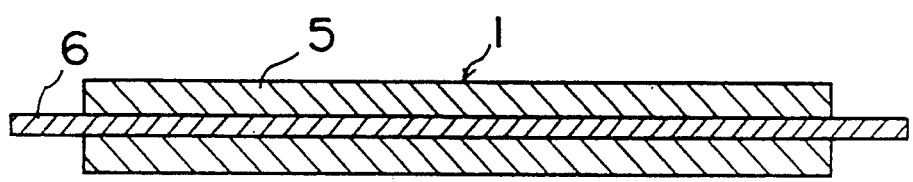
FIGS. 3a–c are cross-sectional views of various embodiments of the magnet roll.
Figure 3B:
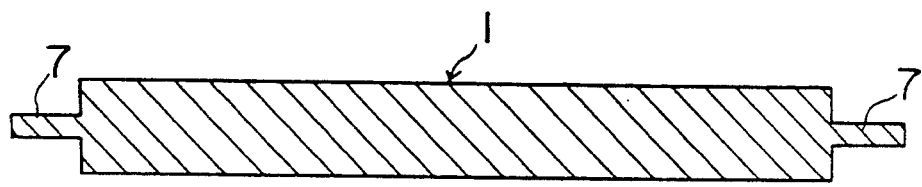
Figure 3C:
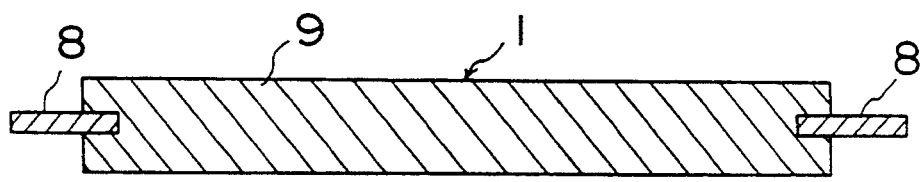
Figure 4:
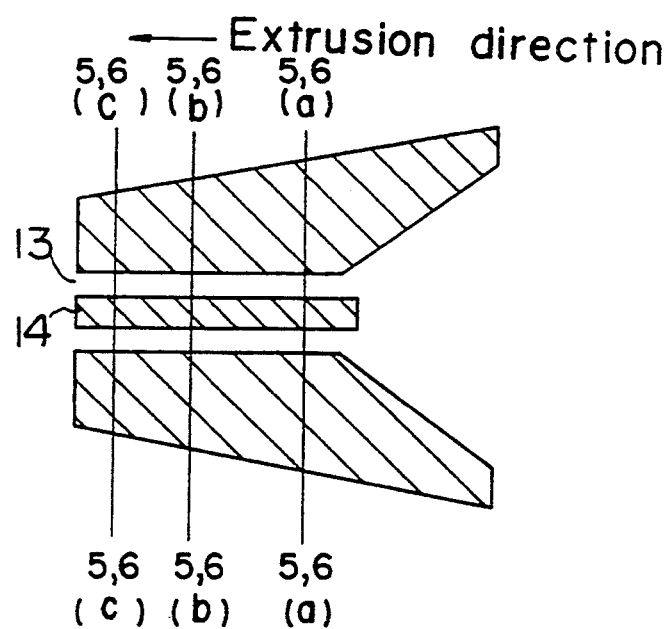
FIG. 4 is a longitudinal cross-sectional view of a magnetic field orientation die used in the first invention.
Figure 6A:
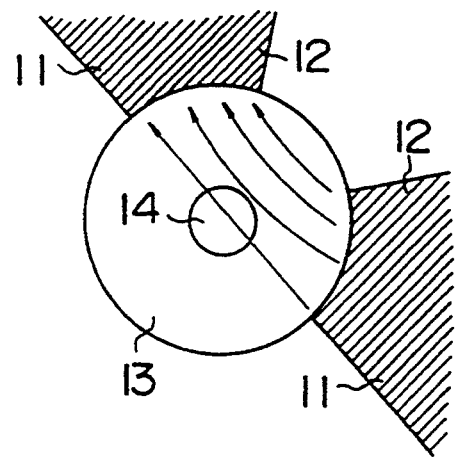
Figure 6B:
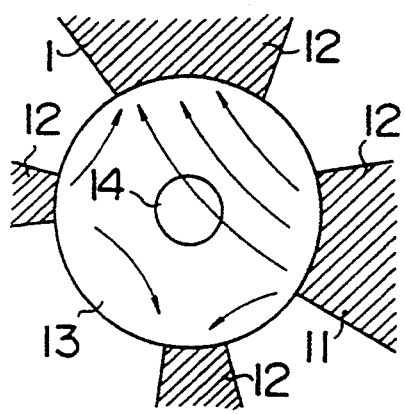
Figure 6C:
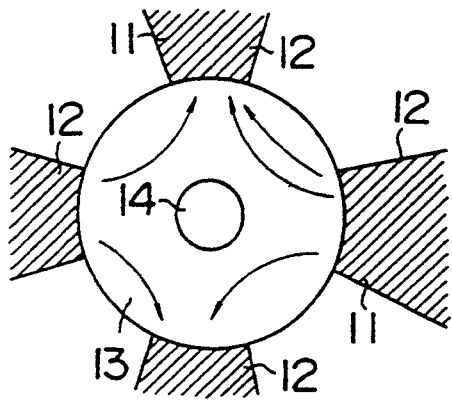
Figure 7:
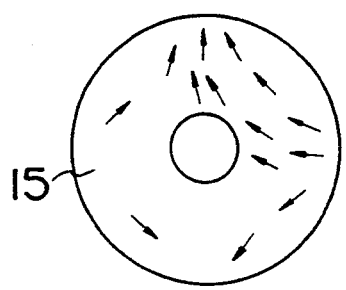
Figure 8:
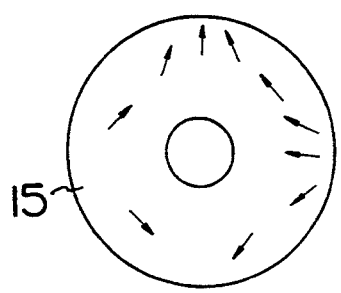
Figure 9A:
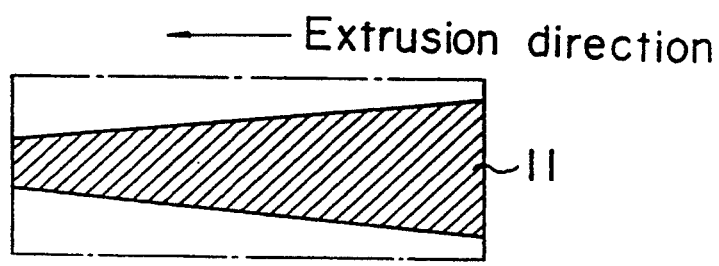
Figure 10:
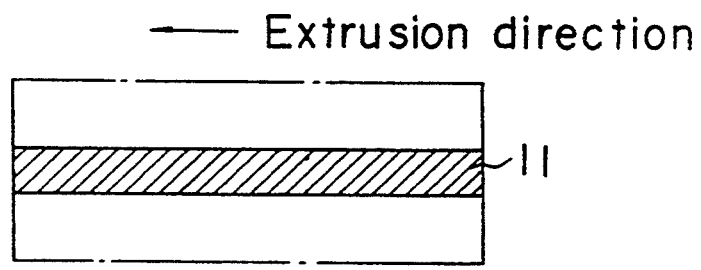
Figure 11A:
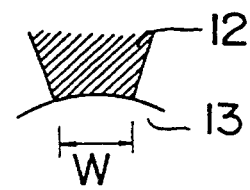
Figure 11B:
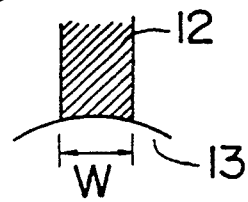
Figure 11C:
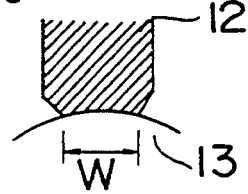
Figure 11D:
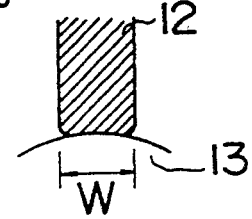
Figure 11E:
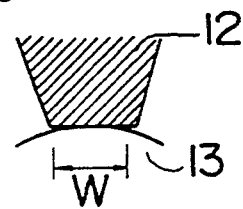
Figure 12:
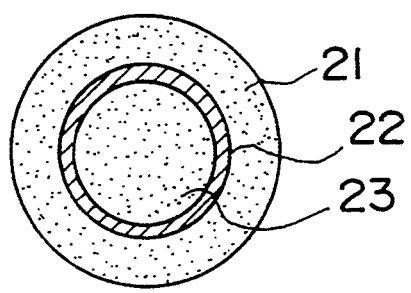
Figure 13:
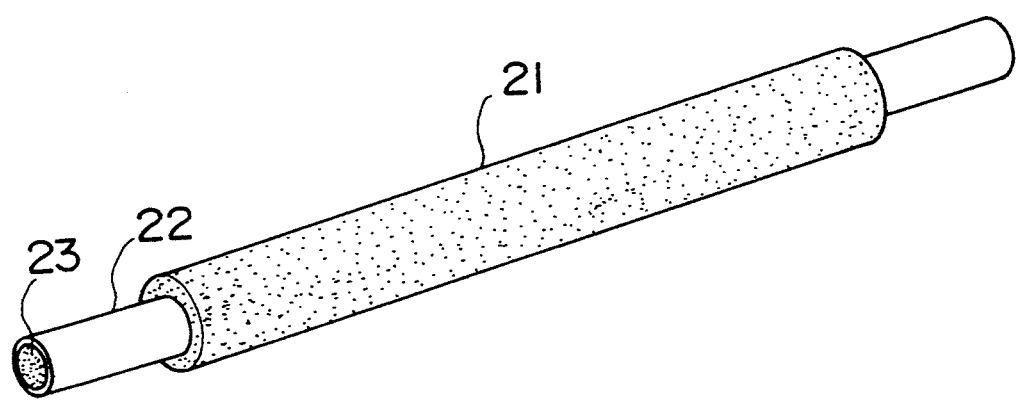
Figure 14:
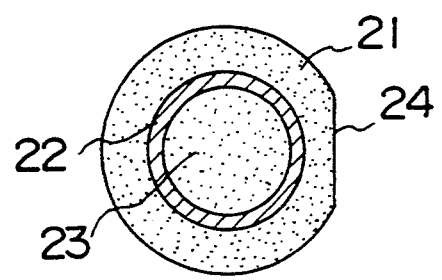
Figure 15:
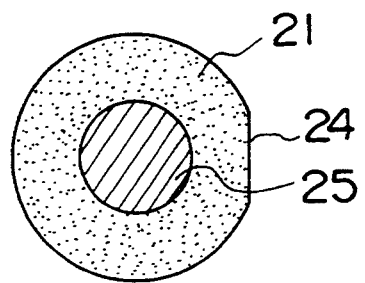
Figure 16:
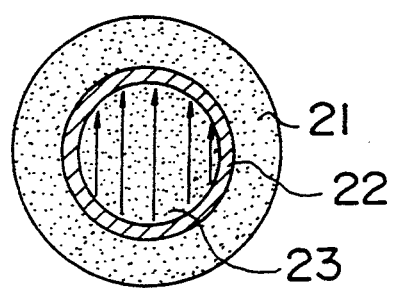
Figure 18:
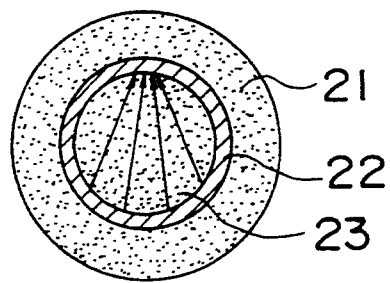
Figure 21:
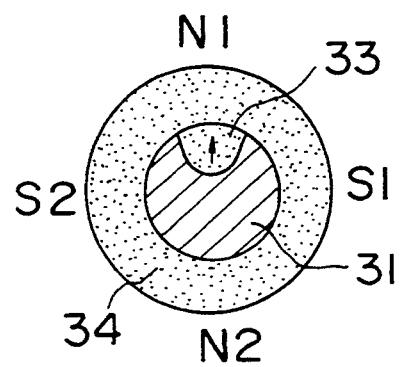
Figure 22:
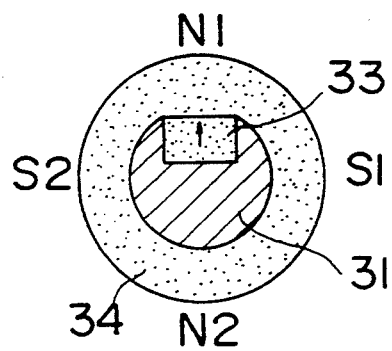
Figure 23:
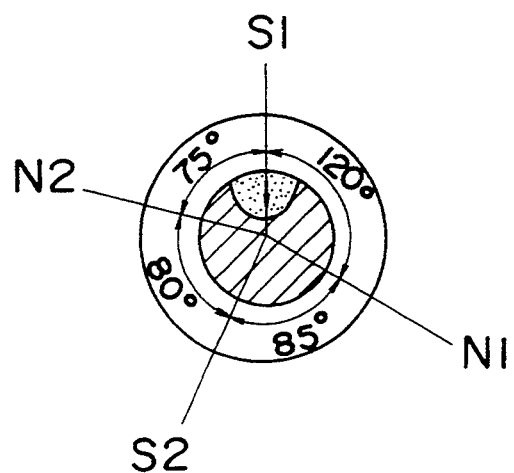
Figure 24:
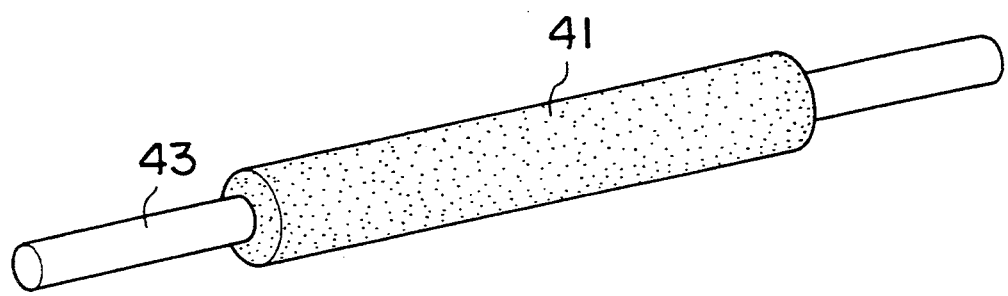
Figure 25:
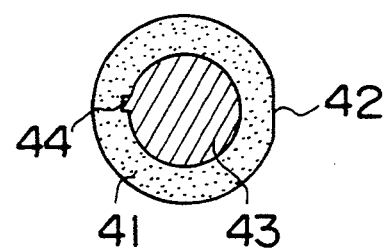
Figure 26A:
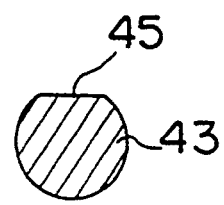
Figure 26B:
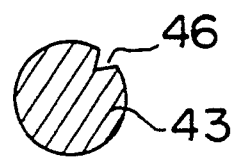
Figure 26C:
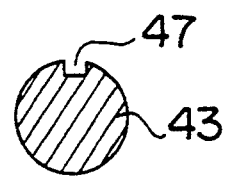
Figure 27A:
Figure 27B:
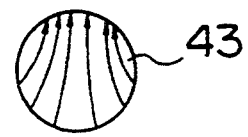
Figure 27C:
Figure 28:
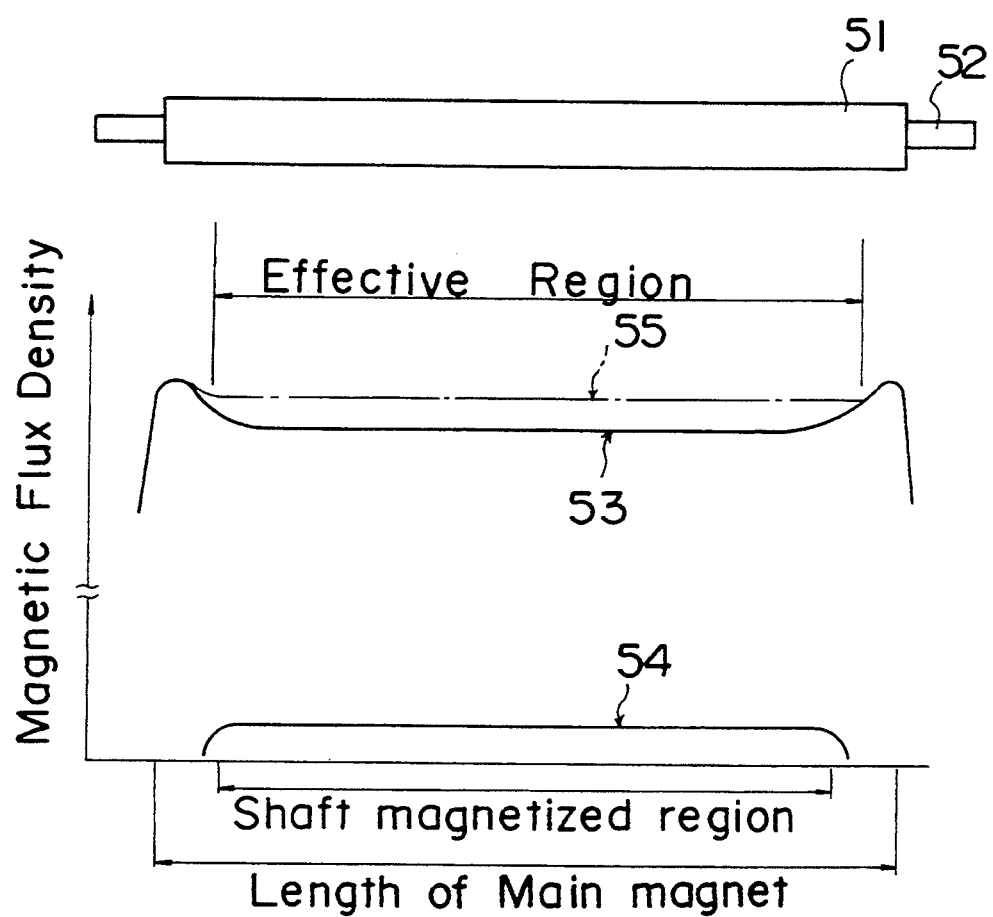
Figure 29:
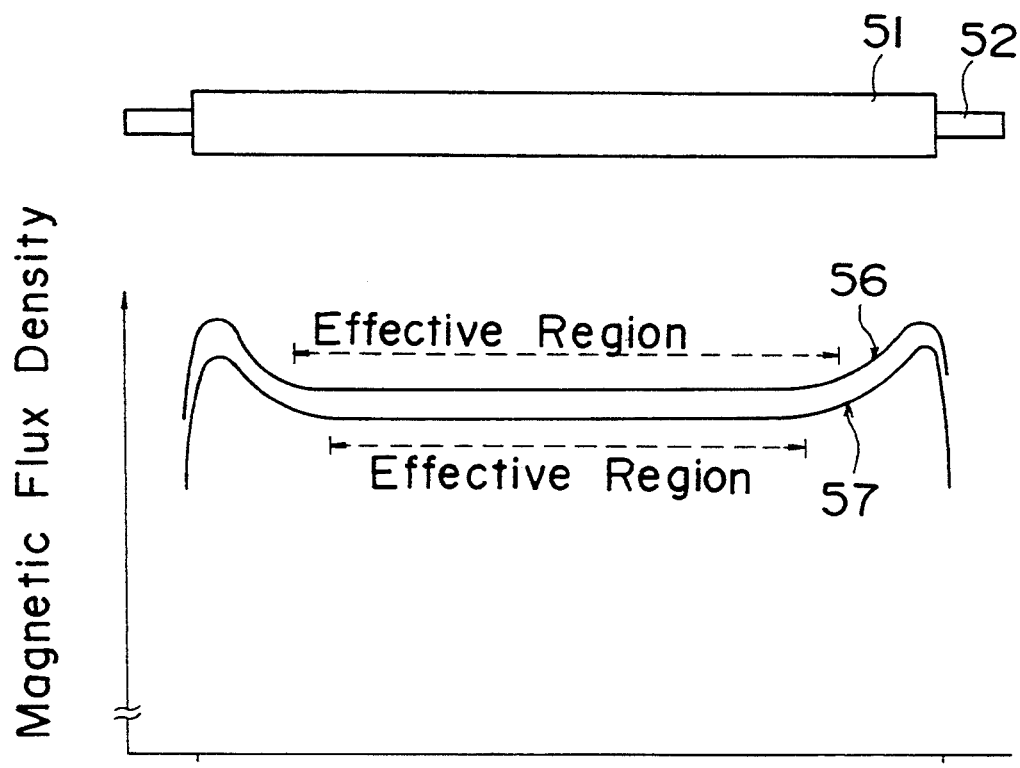
Figure 30:
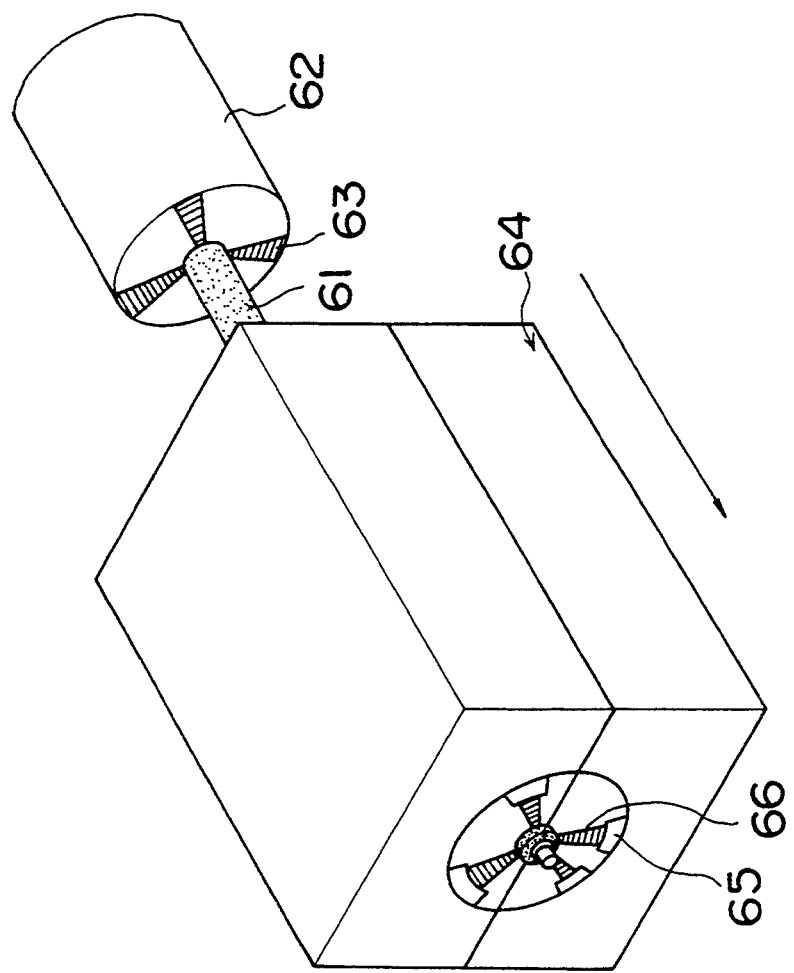
Figure 31:
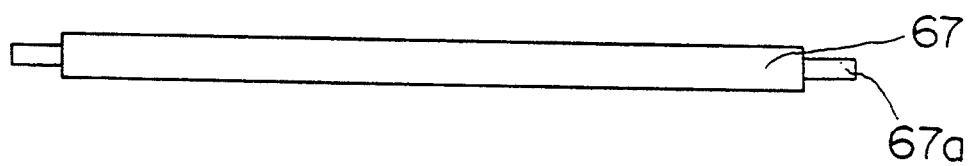
Figure 32A:
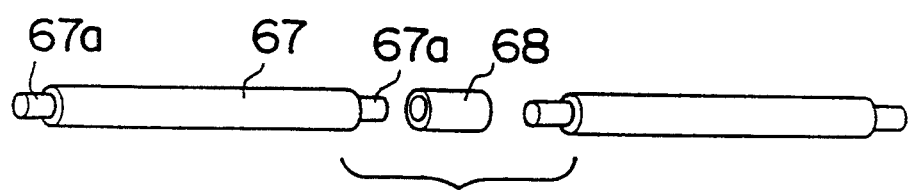
Figure 32B:
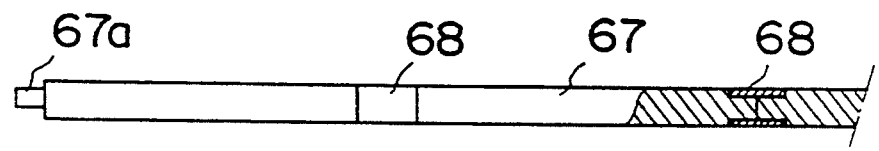
Figure 41:
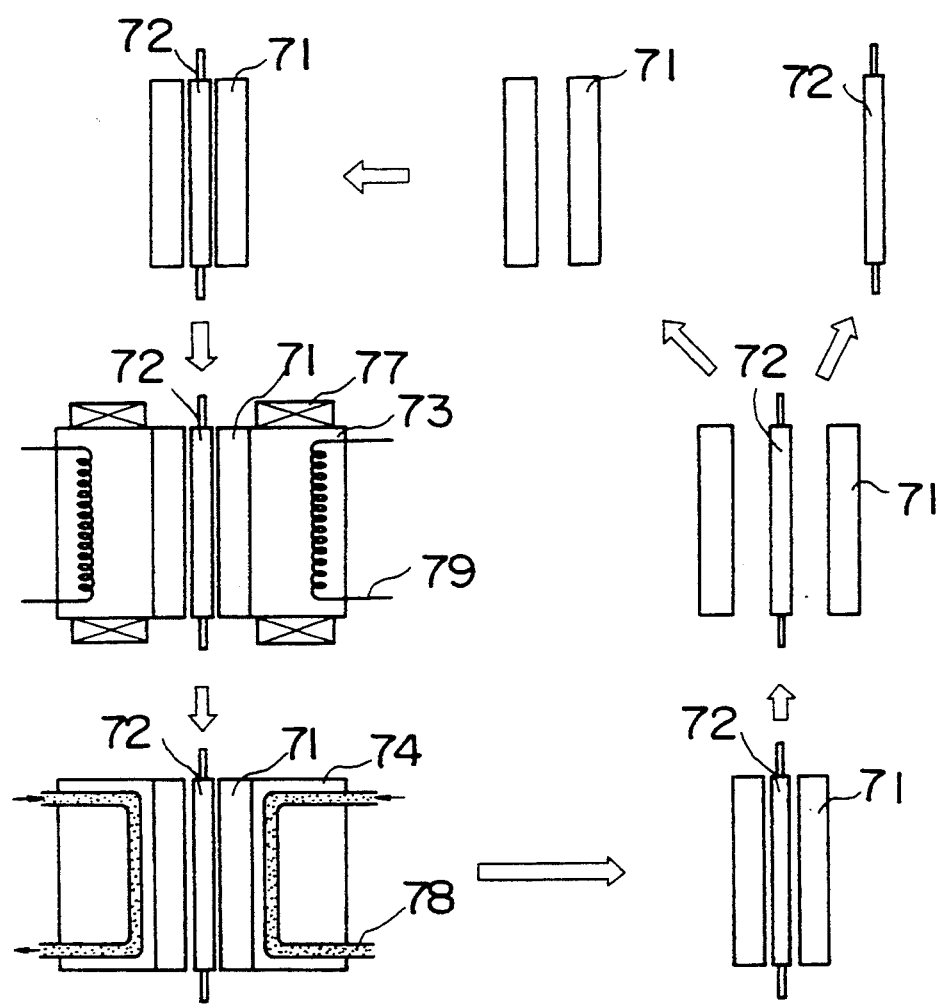
Figure 42:
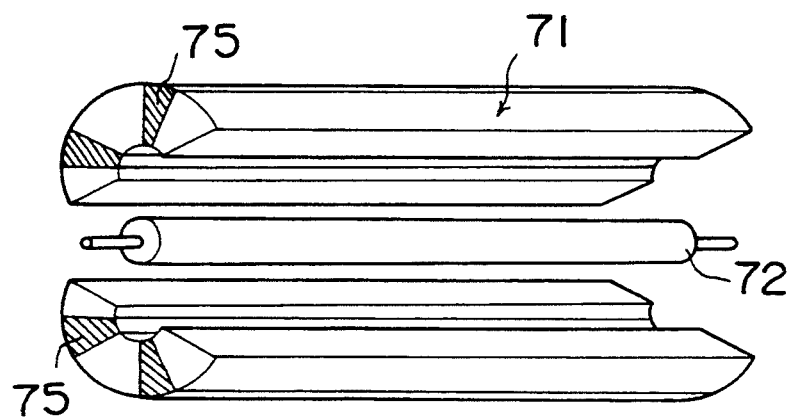
Figure 43:
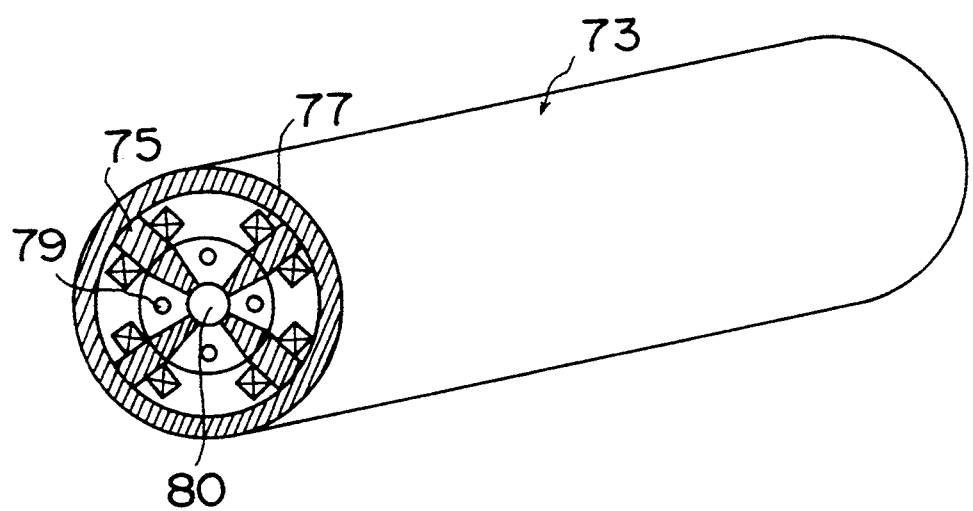
Figure 44:
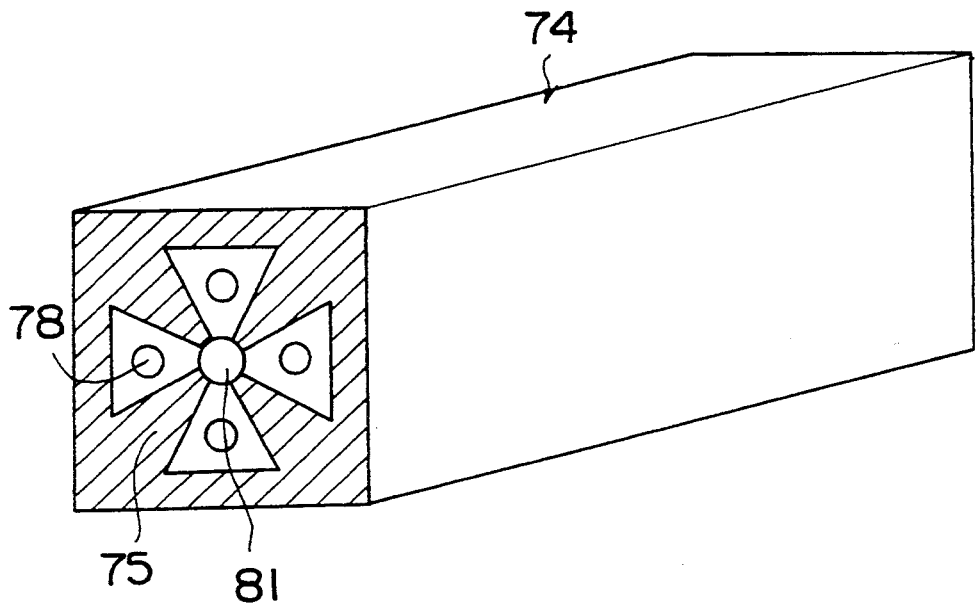
Figure 45:
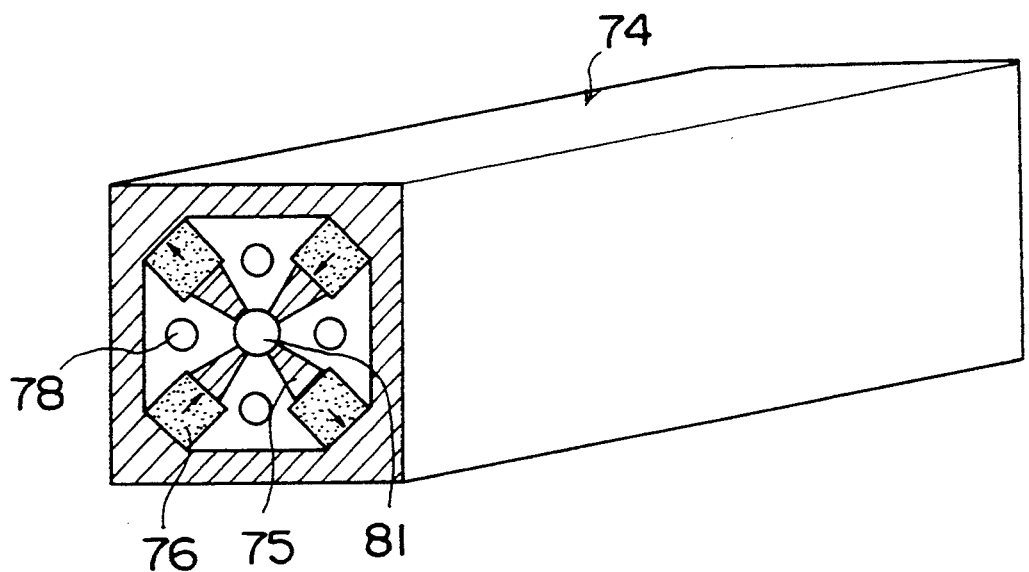
Figure 46A:
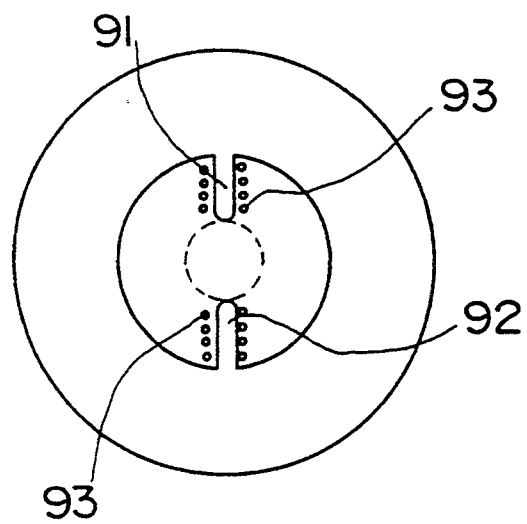
Figure 46B:
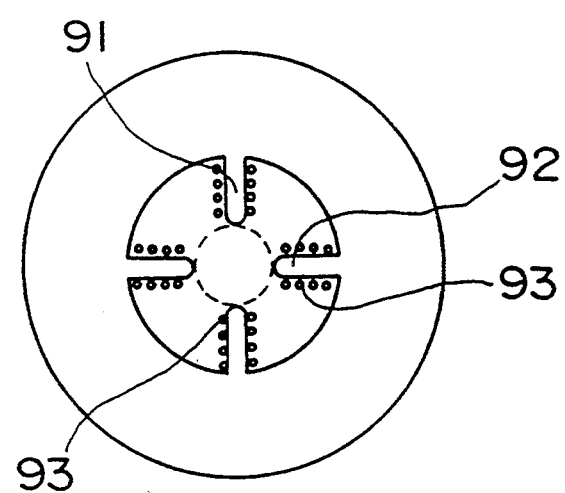
Figure 47A:
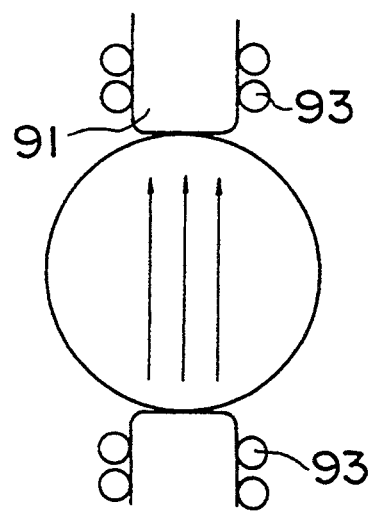
Figure 47B:
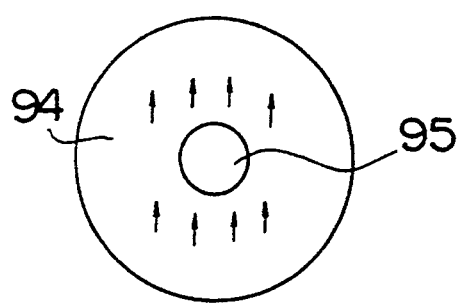
Figure 48A:
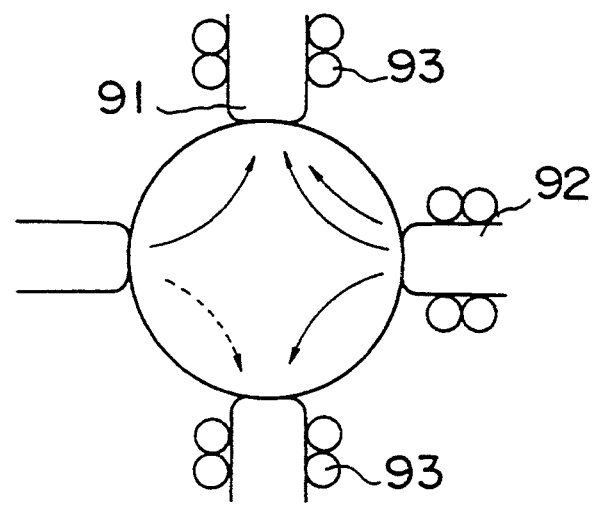
Figure 48B:
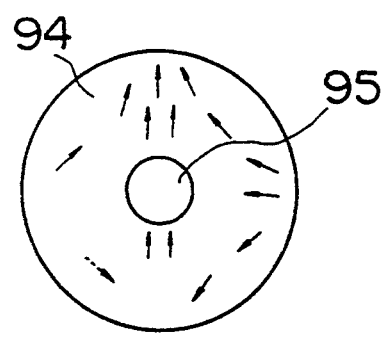
Figure 49A:
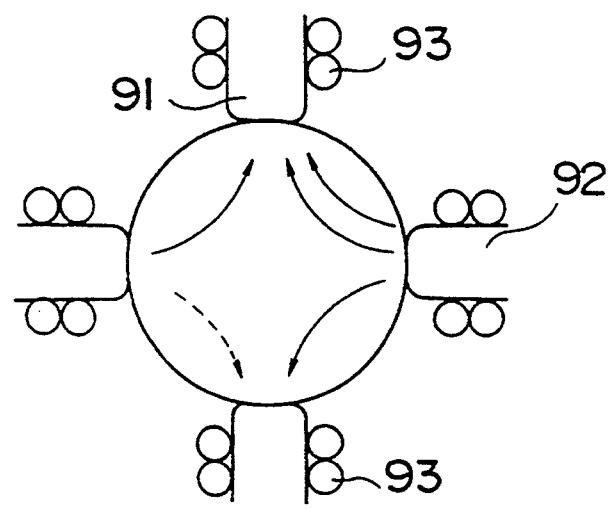
Figure 49B:
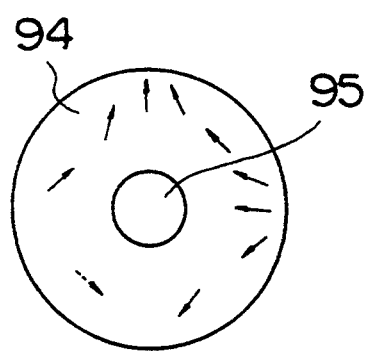
Figure 50:
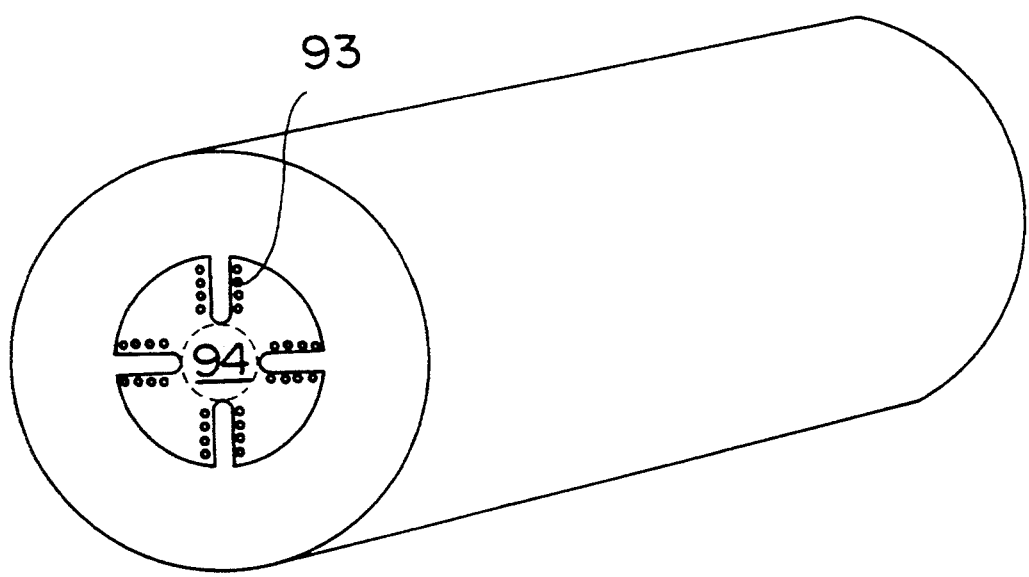

where (a) shows a cross section c—c', (b) shows a cross section b—b' and (c) shows a cross section a—a';

FIG. 6 is a partial cross-sectional view of the magnetic field orientation die, as shown in FIG. 4. which schematically shows lines of magnetic force in a molding space at each position in the axial direction, where (a) is a schematic view of the distribution of the lines of magnetic force at the c—c' position, (b) is a schematic view of the distribution of the lines of magnetic force at the b—b' position, and (c) is a schematic view of the distribution of the lines of magnetic force at the a—a' position;

FIG. 7 is a schematic view of the orientation state of magnetic particles in a product obtained through a molding process of an embodiment of the first invention;

FIG. 8 is a schematic view showing the orientation state of magnetic particles in a product obtained through a conventional molding process which is a comparative example;

FIGS. 9(a) and (b) show the shape variation of the tip portion of ferromagnetic material at the land wall of the magnetic field orientation die used in the invention in an extrusion direction;

FIG. 10 shows the shape variation of the tip portion of ferromagnetic material at the land wall of a conventional magnetic field orientation die;

FIG. 11(a) to (c) show embodiments of the tip portion of the ferromagnetic material;

FIG. 12 is a cross-sectional view of a magnet roll of the second invention;

FIG. 13 is a perspective view of the magnet roll of the second invention;

FIG. 14 is a cross-sectional view of the magnet roll having a cut surface according to the second invention;

FIG. 15 is a cross-sectional view of a conventional magnet roll having a cut surface;

FIG. 16 is a cross-sectional view of a magnet roll using a shaft comprising a magnet-material filled pipe having a dipolary magnet having an angular interval of 180° between magnetic poles;

FIG. 27 is a cross-sectional view of a magnet roll using a shaft comprising a magnet-material filled pipe having a dipolary magnet having an angular interval below 180° between magnetic poles;

FIG. 18 is a cross-sectional view of a magnet roll using a shaft comprising a magnet-material filled pipe having a dipolary magnet having magnetic poles of different width;

FIG. 19 shows an embodiment of a shaft body used in the third invention, where (a) is a longitudinal-sectional view of the shaft body and (b) is a traverse cross-sectional view of the shaft body;

FIG. 20 shows a state where the shaft of the embodiment is filled with magnet material, where (a) is a longitudinal-sectional view of the shaft body, and (b) is a traverse cross-sectional view of the shaft body;

FIG. 21 is a cross-sectional view of an embodiment of the magnet roll according to the third invention;

FIG. 22 is a cross-sectional view of another embodiment of the magnet roll according to the third invention;

FIG. 23 is a cross-sectional view of another embodiment of the magnet roll according to the third invention;

FIG. 24 is a perspective view of a magnet roll of the fourth invention;

FIG. 25 is a cross-sectional view of an embodiment of the magnet roll of the fourth invention;

FIG. 26 are cross-sectional views of the respective embodiments of the shaft used in the fourth invention, where (a) shows the shaft equipped with a cut surface, (b) shows the shaft equipped with a V-shaped groove, and (c) shows the shaft equipped with a U-shaped groove;

FIGS. 27(a), (b) and (c) are cross-sectional views showing the magnetization state of the shaft used in the fourth invention;

FIG. 28 is the external appearance of a magnet roll according to the fifth invention, and shows the magnetic flux density distributions of the magnet roll and the main magnet and the magnet shaft constituting the magnet roll;

FIG. 29 is the external appearance of a magnet roll of a comparative example, and shows the magnet flux density distribution of the magnet roll;

FIG. 30 is a schematic diagram of the construction of an apparatus used in the sixth invention;

FIG. 31 shows outside dimension of a shaft used in the sixth invention;

FIG. 32(a) is a perspective view showing a shaft and a socket, and FIG. 32(b) is a partial cross-sectional view showing the linkage state of the shaft and the socket;

FIGS. 33 to 50 show a series of producing processes according to the sixth invention;

FIG. 41 is a schematic diagram showing the idea of a heating process under magnetic field and a cooling process under magnetic field according to the seventh invention;

FIG. 42 is a perspective view of a sizing metal mold used in an embodiment of the seventh invention;

FIG. 43 is a diagram showing a heating apparatus used in the embodiment of the seventh invention;

FIG. 44 is a diagram showing a cooling apparatus having no source of magnetic field, which is used in the embodiment of the seventh invention;

FIG. 45 is a diagram showing a cooling apparatus having a source of magnetic field, which is used in the embodiment of the seventh invention;

FIG. 46 is a schematic diagram showing a magnetizer used in an embodiment of the eighth invention, where (a) shows a preliminary magnetizing yoke, and (b) shows a re-magnetizing yoke;

FIG. 47 shows a first-magnetization state in the embodiment of the eighth invention, where (a) shows magnetizing magnetic field, and (b) is a conceptual diagram of the magnetization state inside of the magnet roll;

FIG. 48 shows a second-magnetization state in the embodiment of the eighth invention, where (a) shows magnetizing a magnetic field, and (b) is a conceptual diagram of the magnetization state inside the magnet roll;

FIG. 49 shows a magnetization state in a conventional example (comparative example), wherein (a) shows magnetizing a magnetic field, and (b) is a conceptual diagram of the magnetization state inside the magnet roll;

FIG. 50 is a perspective view of an example of a conventional magnetizer; and

Figure 51:
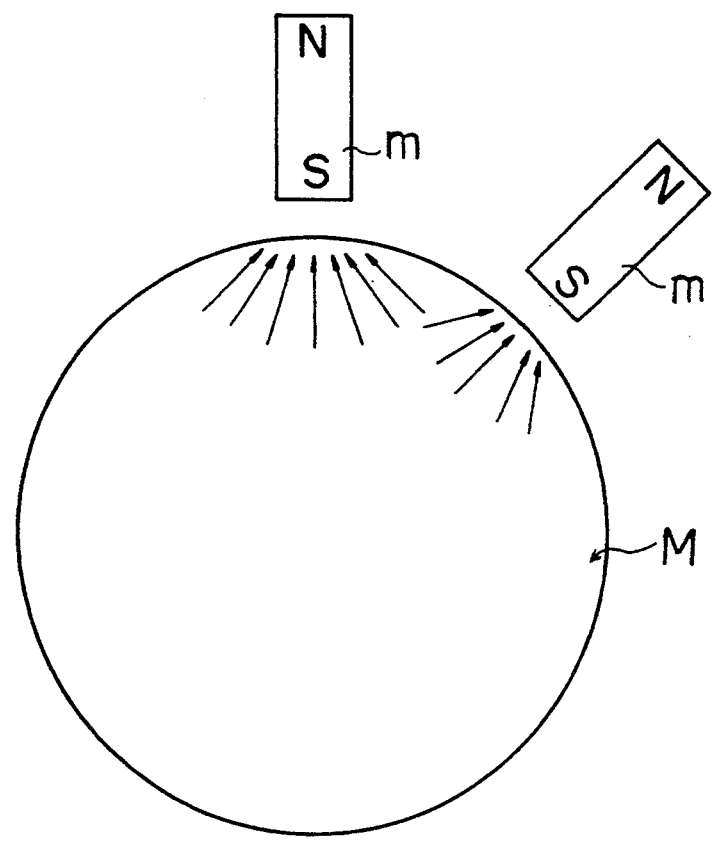

FIG. 51 is an explanatory diagram of magnetic poles which are formed by a focus-orienting method in the presence of a magnetic field.

DETAILED DESCRIPTION OF PREFERRED EMBODIMENTS

The first to eighth embodiments of the invention will be described in detail with reference to the accompanying drawings. Each of the embodiments will be independently described, and these inventions may be used individually or in combination. In the following description, different reference numerals are used for each of the embodiments even though elements as indicated by the reference numerals are identical.

In the first to eighth embodiments as described below, in a magnet roll having the structure in which a longitudinal shaft is penetratingly inserted into the hollow center of a cylindrical magnet body, the cylindrical magnet body disposed around the shaft is referred to as a "main magnet" (of the magnet roll, which is defined as a one-body magnet with multipoles which mainly contributes to the surface magnetic flux density of the magnet roll). Further, when the magnet roll has a cylindrical magnet body and short shafts projecting from both ends of the cylindrical magnet body, the cylindrical magnet body is referred to as a "main magnet".

The main magnet of the magnet roll is formed of resin bonded magnet material which is obtained by dispersing and mixing ferromagnetic material powder with magnetic anisotropy into synthetic resin. No restriction is imposed on the kind of the magnetic material powder of the resin bonded magnet material, and for example, hexagonal ferrite, samarium-cobalt alloy, neodymium-iron-boron alloy, samarium-iron-nitrogen alloy may be used. Hexagonal ferrite (barium ferrite, strontium ferrite) is particularly preferable because it is low in price. Similarly to an ordinary producing method for bonded magnet, these kinds of magnetic material powder can be subjected to a surface treatment for improving the molding and a surface treatment for prohibiting occurrence of rust which becomes a problem in earth element based magnetic material powder. Any thermoplastic material may be used as a binder insofar as it is obtainable through the extrusion molding, and for example, polyvinyl chloride, polyvinyl acetate, copolymer of polyvinyl chloride and polyvinyl acetate, chlorinated polyethylene, and material mixed with suitable plasticizer are representatively used.

The following description is made on the assumption that the main magnet is cylindrical or columnar. However, a flat portion or a recess may be formed on the outer peripheral surface of the main magnet to carry out a positioning operation in a producing process. Therefore, the extrusion molding die or sizing metal die used in this invention is so designed as to have an inner surface shape which is matched with the outer surface shape of the main magnet.

The first invention will be first described with reference to the accompanying drawings. The first invention relates to the structure of the die used in the extrusion molding in the presence of magnetic field.

Figure 5A:
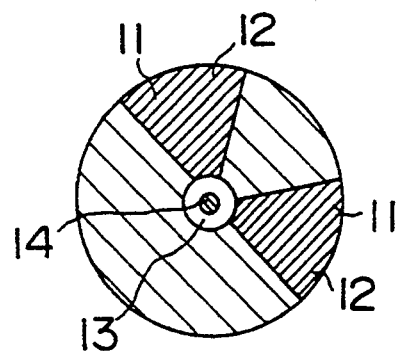
FIG. 5 is a transverse cross-sectional view of the magnetic field orientation die as shown in FIG. 4.

FIG. 4 is a longitudinal-sectional view of the magnetic field molding die for a resin bonded magnet according to this invention. FIGS. 5(I), (II) and (III) are cross-sectional views of the die which are taken along (c—c'), (b—b') and (a—a') of FIG. 4 respectively, and each of which shows the magnetic structure of the die at each portion of the land. In the figures, a reference numeral 12 represents a magnetic yoke, a reference numeral 13 represents a molding space, a reference numeral 14 represents a core, and a reference numeral 11 represents a magnetic yoke of a main magnetic pole disposed at a main magnetic pole forming position. A portion between the magnetic yokes is formed of non-magnetic material. FIGS. 6(I), (II) and (III) show the magnetic field distribution inside of the molding space, and an arrow in the molding space 13 represents a line of magnetic force. FIG. 7 shows the magnetization state inside of the cylindrical molded product formed by the magnet field orientation die as described above, and an arrow of FIG. 7 represents an orientation direction of magnetic particles. FIG. 8 shows the magnetization state inside of a cylindrical molded product formed by a conventional magnetic field orientation die.

Figure 9B:
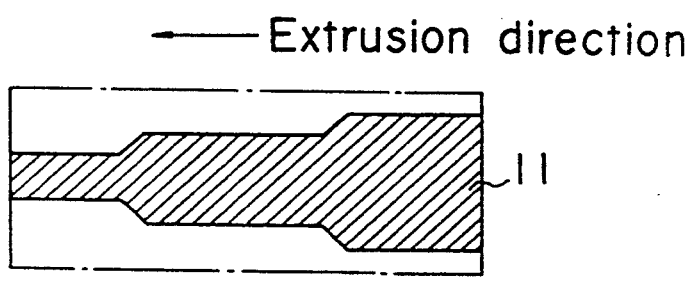

The subject matter of this embodiment resides in that the tip width of ferromagnetic material portion formed at the land is so designed as to be uneven in the extrusion direction, and specifically, the shape of the ferromagnetic material portion may be continuously narrowed in the extrusion direction as shown in FIG. 9(I), or may be stepwisely narrowed as shown in FIG. 9(II).

Figure 5B:
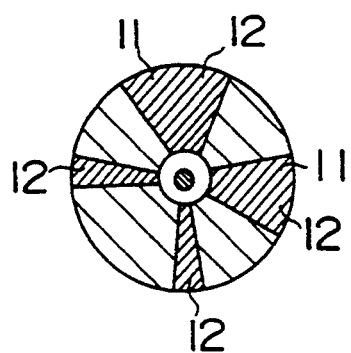
Figure 5C:
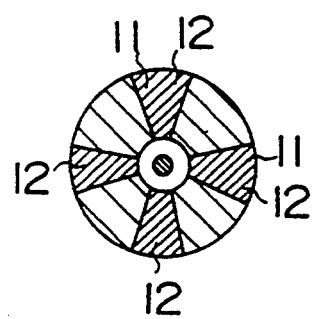

In FIG. 4, the molding material which is supplied from an extrusion screw to the land is first preliminarily oriented (i.e., subjected to a preliminary orientation process) to its inner part by a magnetic field (see FIG. 6(I)) induced by the tip of a broad ferromagnetic material portion at the first half of the land, that is, at the c—c' sectional portion of the die. Here, the preliminary orientation process is defined as a process of orienting magnetic particles preliminarily before the process of making a magnet product with a desired particle orientation distribution. At the last half portion of the land, that is, at the (b—b') and (a—a') sectional portions of the die, the ferromagnetic material portion is narrowed as shown in FIGS. 5(II) and (III), and the molding material is newly oriented at the surface portion thereof by the magnetic field of the ferromagnetic material portion of the desired number of magnetic poles, while the preliminary orientation which has been formed in the inner part of the molding material is left as is.

This invention will be further described in detail in the description of the first preferred embodiment; however, this invention is not limited to the following embodiment.

SS41, S25C, SUS410, permendur (FeCo alloy) or the like may be used as magnetic material for the ferromagnetic material portion of the land. Austenite-based stainless such as SUS304, SUS316 or the like, copper-beryllium alloy, high-manganese steel or the like may be used as non-magnetic material. The land wall formed of these materials may be suitably subjected to a surface treatment to improve abrasion resistance.

The following is an experiment result which was conducted on the basis of the first preferred embodiment of this invention.

Embodiment 1

A pellet containing a composition as listed in table 1 was provided, and the cylindrical extrusion molding in the presence of a magnetic field was conducted using the pellet. The pellet contained the composition as listed in table 1 and was used in not only the embodiment of the first invention, but also the embodiments of the second to eighth inventions as described later. The composition of table 1 is assumed to be used for the resin bonded magnet material in each embodiment insofar as it is particularly described.

In this embodiment, the die as shown in FIG. 4 was used, and the shape of the tip of the ferromagnetic material portion in the extrusion direction was so designed as to be varied, as shown in FIG. 9(I)

TABLE 1

| | |
|---|---|
| Strontium ferrite (OP71, produced by Nihon Bengara Co., Ltd) | 90.0 weight % |
| Polyvinyl chloride (s1001, produced by Kaneka Corporation) | 7.0 weight % |
| Di-2-ethylhexyl phthalate (DOP) | 2.8 weight % |
| Tri-basic lead sulphate (Tribase) | 0.1 weight % |
| Lead stearate | 0.1 weight % |

SS41 was mainly used for the magnetic material of the yoke portion, and SUS316 was mainly used for non-magnetic material between the magnetic poles, etc. The diameter of the land formed from the above materials was set to 20$\phi$. A 6$\phi$ core was provided at the center portion of the land.

An iron shaft having 6$\phi$ diameter was adhesively inserted into the cylindrical mold product thus formed to obtain a magnet roll, and the peak values of the surface magnetic flux density at each magnetic pole of the magnet roll thus obtained, as shown in table 2. The orientation state of magnetic particles in the molded product is schematically shown in FIG. 7.

Comparative Example 1

A magnet roll serving as comparative example 1 was formed in the same manner as the embodiment 1 as described above, except for use of a conventional die having a land which was disposed around the ferromagnetic material portion having uniform tip width in the extrusion direction shown in FIG. 10. The result is shown in table 2. The orientation state of magnetic particles in the molded product in this case is schematically shown in FIG. 8.

TABLE 2

| | S1 | N1 | S2 | N2 |
|---|---|---|---|---|
| Embodiment 1 | 895 | 890 | 615 | 610 |
| Comp. Example 1 | 860 | 850 | 650 | 655 |

(unit: gauss)
*S1 represents a first magnetic pole of S-pole,
S2 represents a second magnetic pole of S-pole,
N1 represents a first magnetic pole of N-pole, and
N2 represents a second magnetic pole of N-pole, As is apparent from table 2, in comparison with "Comparative Example 1", the extrusion molding in the presence of a magnetic field according to the "Embodiment 1" can perform the orientation to the inner portion of the molded product, and can obtain a resin bonded magnet product having improved surface magnetic flux density at the S1-pole and N1-pole which serve as main poles.

According to the first invention, as described above, in the extrusion molding in the presence of a magnetic field for a cylindrical or columnar resin bonded magnet product, the die is so designed that the tip width of the ferromagnetic material portion corresponding to the main poles is made different between the first half portion of the land and the outlet of an extrusion die; that is, the tip width at the first half portion of the land is broader than that at the outlet of an extrusion die. Therefore, the orientation can be performed to the inner part of the molded product, and a magnet roll providing high magnetic flux density can be obtained. Through this molding method, a magnet roll having excellent magnetic property which is comparable to that obtained in the injection molding and is stable in its longitudinal direction can be obtained at low cost irrespective of use of the injection molding.

Next, an embodiment of the second invention will be described with reference to the accompanying drawings. The second invention relates to the shaft structure which is applicable to a slender magnet roll.

FIGS. 12 and 13 show a magnet roll of this invention, and in the figures, a reference numeral 21 represents a main magnet formed of resin bonded magnet, a reference numeral 22 represents a pipe, and a reference numeral 23 represents a solid portion formed of resin bonded magnet. Materials which may be used in this invention for the non-magnetic pipe 22 are aluminum, aluminum alloy (Al-Cu, Al-Zn, etc.), brass, non-magnetic stainless (for example, SUS-316, SUS-304), plastic or the like. The thickness and outer diameter of the pipe are not fixedly determined because they are dependent on pipe material, a desired value of surface magnetic flux density for a magnet roll, etc. However, it is preferable that the thickness of the pipe is set to a value above 0.3 mm, and that the outer diameter of the pipe is set to a value below 15% of that of the magnet roll. In addition, the outer diameter of the pipe is more preferably set to a range from 40% to 70% of that of the magnet roll. Below 40%, the strength of the pipe is excessively low, so that sagging of the pipe frequently occurs. Above 70%, the surface of the pipe approaches to the surface of the magnet roll, so that the surface magnetic flux density of the magnet roll is excessively reduced.

The main magnet 21 is substantially cylindrical, and may be formed with a cut surface 24 as shown in FIG. 14 to suitably perform a positioning operation.

In order to provide the peripheral surface of the main magnet 21 with prescribed magnetic poles, any one of "a method of extruding with focus orientation" and "a method of extruding under no magnetic field and then multipolary-magnetizing" may be selected. The former method is preferable because it can provide a main magnet having high magnetic property. However, if a desired level of surface magnetic flux density can be ensured, the latter method may be selected because it is easily used. Particularly when a slender magnet roll is required, it recommended to use the latter method with magnetic powder of rapid quenched NdFeB based material.

The injection molding of extrusion molding may be used to fill magnetic material into the hollow 23 of the pipe 22 to form a solid portion 23 in the pipe 22. The injection molding is particularly convenient. Use of the injection molding seems to deteriorate the producibility; however, this is not necessarily true. The reason for this is that the construction of the metal mold is simple, because this injection molding requires no magnetic field, and the cooling rate is high because the pipe is slender, so that the molding cycle can be shortened. A binder for resin bonded magnet material which is used for the injection molding is required to be formed of material which is easily subjected to the injection molding and is melted at the temperature of the extrusion molding for the magnet roll body. Polyethylene is suitably used as representative synthetic resin to satisfy the above requirement.

In a case of selecting the method of extruding the pipe filled with non-magnetized magnet material with the melted resin magnet material under no magnetic field, and then magnetizing them, a binder for the magnet material filled into the pipe preferably melted at a temperature higher than that of the synthetic resin of the main magnet 21. If polyvinyl chloride based resin is selected as resin for the main magnet 21, polyamide resin (nylon 6, nylon 66, nylon 46, nylon 12, etc.) or polypropylene resin is suitable as a binder for the magnet material filled into the shaft.

On the other hand, when hard plastic or reinforced plastic is used for the pipe 22, the resin bonded magnet material can be extruded with the pipe material using two extrusion machines. That is, there can be used a tandem extrusion molding where the resin bonded magnet material, which is molded by a first extrusion machine and then cooled, is penetrated into a cross-head die secured to a second extrusion machine, and then a pipe material is extruded around the resin bonded magnet material to integrate both materials into one body; or a two-color extrusion molding can be used, where the resin bonded magnet material is extruded into a cross-head die from the first extrusion machine, and then the pipe material is extruded from the second extrusion machine to integrate both materials into one body.

Next, embodiments which were conducted to ascertain the effect of this invention will be described.

Embodiment 2-(1)

Regarding the shaft (plastic bonded magnet material filled pipe)

A pellet of plastic bonded magnet compound which contains 91 weight % of strontium ferrite (OP71) produced by Nihon Bengara Co., Ltd. and a binder of low-density polyethylene (0.915 g/cm$^3$ in density) was prepared, and then filled into a pipe by an injection molding machine. The pipe was formed of aluminum-copper alloy (92Al, 8Cu), and had a 240 mm length, a 5 mm outer diameter and a 3.8 mm inner diameter.

Regarding the main magnet

The main magnet was formed of the composition as listed in table 1.

The pellet formed of the composition of table 1 was extruded with the shaft in the presence of a magnetic field to form a focus-oriented one-body magnet with multi-poles of 9.5 mm in outer diameter and 220 mm in length, and which had four magnet poles and angular intervals between peak values (hereinafter referred to as "interpeak angle") of radial magnetic component of surface magnet flux density as listed in table 3.

TABLE 3

| ANGULAR INTERVAL BETWEEN MAGNETIC POLES | |
|---|---|
| ∠S1-N1 | 120 Degree |
| ∠N1-S2 | 85 Degree |
| ∠S2-N2 | 80 Degree |
| ∠N2-S1 | 75 Degree |

S1 represents a first magnetic pole of S-pole,
S2 represents a second magnetic pole of S-pole,
N1 represents a first magnetic pole of N-pole, and
N2 represents a second magnetic pole of N-pole, Comparative example 2-(1)

The pellet formed of the composition as listed in table 1 was subjected to the extrusion molding in the presence of a magnetic field to form a quadrupolary magnetized longitudinal magnet of 220 mm in length, 9.5 mm in outer diameter and 3.05 mm in inner diameter, and then a soft-iron round bar shaft 25 of 3.0 mm in outer diameter was penetrated into the magnet as shown in FIG. 15. The interpeak angles of the embodiment 2-(1) as listed in table 3 was also adopted for the interpeak angles of this embodiment. Here, the inner diameter of the main magnet 21 was set to be slightly larger than the outer diameter of the shaft 25 because the penetration was easily performed and an adhesive layer was formed between the inner surface of the main magnet 21 and the outer surface of the shaft 25.

Regarding an experimental result i) Comparison of peak value of surface magnetic flux density.

Plural samples of each of the above two kinds of magnet rolls were picked up, and the peak value of the surface magnetic flux density of each sample was measured using a gauss meter "HGM8300" produced by ADS Co., Ltd. (hereinafter referred to as "ADS gauss meter") and a Hall probe "FS-4" in a state where a Hall element was disposed away from the rotational center of the magnet roll at a distance of 5.55 mm. The result is shown in Table 4.

TABLE 4

| MAGNETIC POLE | EMBODIMENT 2-(1) | COMP EXAMPLE 2-(1) |
|---|---|---|
| S1 | 790–810 | 730–850 |
| N1 | 785–795 | 720–840 |
| S2 | 655–670 | 610–690 |
| N2 | 640–660 | 580–670 |

(Unit of surface magnetic flux density is gauss)

The samples of "Comparative example 2-(1)" had a large dispersion in surface magnetic flux density, and the surface magnetic flux density at measuring positions was excessively low, so that many samples were unusable as a magnet roll. On the other hand, the samples of "Embodiment 2-(1)" had small dispersion in surface magnetic flux density, and all of the samples were usable as a magnet roll.

ii) Core Eccentricity

The eccentricity of the central portion (core) of each sample in the longitudinal direction when the two kinds of magnet rolls, as described above, were rotated was measured using a laser length measuring machine, and the result is shown in table 5.

TABLE 5

| | CORE ECCENTRICITY/mm |
|---|---|
| EMBODIMENT 2-(1) | 0.02–0.04 |
| COMP. EXAMPLE 2-(1) | 0.05–0.20 |

The reason for the large core eccentricity of "Comparison example 2-(1)" is as follows. That is, many round bar shafts of 3 mm $\phi \times 240$ mm had been already bent before they were inserted into the main magnets, and when a product is stored in the form of a magnet roll while supported by a shipping pallet at both sides thereof, the product is liable to be bent due to its dead weight during a storage period. In addition, since the shaft orientation (the direction of the shaft on the cross section) when the shaft is penetrated into the central portion of the main magnet 21 is dispersed every shaft, the core eccentricity of each magnet pole is not fixed. These are the reasons why the magnetic flux density of the "Comparative example 2-(1)" had large dispersion. On the other hand, in the product of the "Embodiment 2-(1)," the core eccentricity of the shaft itself is small, and it is not bent after fabricated. Therefore, the magnetic flux density of the product of this invention had small dispersion.

Embodiment 2-(2)

Regarding shaft (resin bonded magnet material filled pipe)

A pellet of resin bonded magnet compound containing 90.5 weight % of strontium ferrite "OP71" produced by Nihon Bengara Co., Ltd. and nylon 12 as a binder was prepared, and the pellet was filled into a pipe having the same inner diameter, outer diameter, length and material as the pipe of the "Embodiment 2-(1)" by the injection molding machine. A permanent magnet (Sm-Co based sintered magnet) and a soft-iron yoke were disposed around the metal mold cavity, so that a magnetic field was allowed be induced in the same direction as a magnetic field to be applied the quadrupolary-magnetized main magnet. Therefore, the shaft itself comprises the magnet having four magnetic poles.

Regarding the main magnet

The pellet formed of the same composition as the "Embodiment 2-(1)" as listed in table 1 was extruded with shaft (resin bonded magnet material filled pipe) at 150° C. in the presence magnetic field to form a quadrupolary-magnetized focus-oriented magnet roll having the same dimension and interpeak angles of surface magnetic flux density as the "Embodiment 2-(1)". The resin bonded magnet in the pipe was not melted at 150° C. The direction of the magnetic field (four poles) induced by the extrusion die was set to the same direction as the magnetic field applied to the shaft. The core eccentricity of these magnet rolls was 0.035 to 0.060 mm, and there was no large difference between this embodiment and "Embodiment 2-(1)". The peak value of the surface magnetic flux density is shown in Table 6.

TABLE 6

| MAGNETIC POLE | SURFACE MAGNETIC FLUX DENSITY (GAUSS) |
|---|---|
| S1 | 810–820 |
| N1 | 800–815 |
| S2 | 660–680 |
| N2 | 670–690 |

The surface magnetic flux density of this embodiment is slightly larger than the "Embodiment 2-(1)", and this is because the plastic bonded magnet in the shaft is beforehand strongly magnetized.

Embodiment 2-(3)

Regarding shaft (resin bonded magnet material filled pipe)

Resin bonded magnet compound containing 92 weight % of magnetic powder of rapid quenched NdFeB material (MQ powder) produced by General Motors of USA and nylon 12 as a binder was prepared, and then the compound was filled into a pipe by the injection molding machine. The pipe was formed of a aluminum-zinc-copper alloy, and its dimension was 4.00 in outer diameter, 3 mm in inner diameter and 240 mm in length.

Regarding main magnet

The main magnet was formed of the composition as listed in Table 7.

TABLE 7

| | |
|---|---|
| magnetic powder of rapid quenched NdFeB material (trade name: MQ powder produced by USA GM Co., Ltd.) | 89.0 weight % |
| polyvinyl chloride | 7.5 weight % |
| (trade name: S1001 produced by Kaneka Corporation) | |
| di-2-ethylhexyl phthalate (DOP) | 3.3 weight % |
| tri-basic lead sulphate (tri-base) | 0.1 weight % |
| lead stearate | 0.1 weight % |

The pellet formed of the composition as listed in Table 7 was extruded with the shaft (plastic bonded magnet material filled pipe) as described above at 150° C. in the absence of magnetic field to form a magnet roll of 7.0 mm in outer diameter and 220 mm in length. Thereafter, the magnet roll thus formed was inserted into a magnetizer with four poles, and a large pulse current was applied to the magnetizer from a condenser type of pulse power source to magnetize the magnet roll. The interpeak angle of the surface magnetic flux density of the magnet roll after magnetization is shown in table 8.

TABLE 8

| ANGULAR INTERVAL BETWEEN MAGNETIC POLES | |
|---|---|
| ∠S1–N1 | 115 Degree |
| ∠N1–S2 | 92 Degree |
| ∠S2–N2 | 80 Degree |
| ∠N2–S1 | 73 Degree |

The core eccentricity of the magnet roll was 0.03 to 0.05 which was a sufficiently small value. The peak of the surface magnetic flux density are shown in table 9, and these values are preferably-usable values.

TABLE 9

| MAGNETIC POLE | SURFACE MAGNETIC FLUX DENSITY (GAUSS) |
|---|---|
| S1 | 820–830 |
| N1 | 850–880 |
| S2 | 670–690 |
| N2 | 650–670 |

Embodiment 2-(4)

In order to ascertain the effect of increase of magnetic force (surface magnetic flux density), this invention was applied to a magnet roll having larger outer diameter than that of "Embodiment 2-(1)" to "Embodiment 2-(3)" and four magnetic poles (N1, S1, N2 and S2) which vertically intersect one another. That is, the pellet of the magnet compound used in the "Embodiment 2-(1)" was filled into an aluminum pipe of 6.5 mm in outer diameter and 5.5 mm in inner diameter by the injection molding machine. At this time a uniform magnetic field of about 10000 oersteds was applied in the radial direction to magnetize the material filled into the pipe. The filled material was sampled from the pipe, and its magnetic property was measured to indicate the residual magnetic flux density in open state to be 2700 gauss. The shaft (resin bonded magnet material filled pipe) thus obtained was inserted into a main magnet having 14 mm outer diameter, 6.55 mm inner diameter and 220 mm length, which was formed of the composition as listed in table 1, in such a direction that the magnetic force of the N1 pole is increased. The magnetic force measuring result (peak value of surface magnetic flux density) of the magnet roll thus formed is shown in a table 10. In addition, a magnet roll having a main magnet having 6.05 mm inner diameter and a solid iron shaft having 6 mm outer diameter inserted into the main magnet was prepared as a comparative example, and the data of the magnet roll of the comparative example is also shown as "Comparative Example 2-(4)" in table 10.

TABLE 10

| MAGNETIC POLE | EMBODIMENT 2-(4) | EXAMPLE 2-(4) EXAMPLE 2-(4) |
| --- | --- | --- |
| N1 | 870 | 780 |
| S1 | 790 | 800 |
| N2 | 640 | 730 |
| S2 | 680 | 690 |

(UNIT: GAUSS)

As shown in table 10, the surface magnetic flux density of the N1-pole is greatly increased as expected. The surface magnetic flux density of the N2-pole is reduced, however, there is no problem because this magnetic pole is not the main pole.

Embodiment 2-(5)

The following experiment was conducted to further ascertain the effect of an increase in surface magnetic flux density. This invention was applied to a magnet roll having 14 mm outer diameter and 220 mm length which had the same pole arrangement as the magnet roll of table 8. That is, a pellet formed of the same magnet compound as the "Embodiment 2-(1)" as listed in Table 1 was filled into an aluminum pipe having 6.5 mm outer diameter and 5.5 mm inner diameter by the injection molding machine having an electromagnet. A metal mold used in this case was provided with magnetic poles which were disposed away from each other by about 115° and the electromagnet of the molding machine was supplied with magneticomotive force of 20000 ampere-turns (current value X number of turns of coil) to induce a magnetic field in the cavity, so that the magnet compound in the pipe was dipolary magnetized. The resin bonded magnet material filled pipe was inserted into the main magnet having 14 mm outer diameter, 6.53 mm inner diameter and 220 mm length obtained by extruding the composition of table 1 in the presence of magnetic field in such a manner that the N1-pole and the S1-pole of the pipe was substantially coincident with the N1-pole and the S1-pole of the main magnet respectively. The measured result of the magnetic force (surface magnetic flux density) of the magnet roll thus formed is shown in table 11. As a comparative example was prepared a magnet roll comprising a main magnet having 6.03 mm inner diameter and a solid iron shaft (material of SS41) having 6 mm outer diameter which was inserted into the main magnet, and the measured result of the comparative example is also shown as "Comparative example 2-(5)" in table 11.

TABLE 11

| | EMBODIMENT 2-(5) | COMP. EXAMPLE 2-(5) |
| --- | --- | --- |
| S1 | 860 | 795 |
| N1 | 855 | 780 |

(UNIT: GAUSS)

Figure 17:
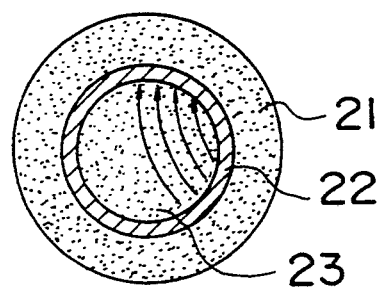

Various modes may be considered for the embodiment to promote the increase of surface magnetic flux density of the magnet roll using the magnetic force (magnetic flux density) inside of the shaft. For example, in the mode of FIG. 16, an intersecting angle between the N-pole peak position and the S-pole peak position is set to 180°. In FIG. 16, the arrow represents a line of magnetic force. In the mode of FIG. 17, an intersecting angle between N-pole peak position and the S-pole peak position is set to a value below 180°. Further, in the mode of FIG. 18, the magnetic poles having different widths are provided.

As described above, using a non-magnetic pipe filled with resin bonded magnet material, the slender multipolary magnetized focus-oriented magnet roll which is hardly bent can be produced by the extrusion molding having high producibility without greatly reducing the surface magnetic flux density thereof. Accordingly, this embodiment can contribute to the promotion of miniaturization and thinning of equipments using an electrophotographic technique such as an electronic copying machine, a facsimile, an LBP, etc. Further, this embodiment is applicable to not only a slender multipolary magnetized focused oriented magnet roll, but also a thick one to increase the magnetic force (magnetic flux density) of a specific magnetic pole.

A third embodiment will be next described with reference to the accompanying drawings. Like the second embodiment, the third embodiment relates to the shaft structure which is suitably applicable to a slender magnet roll.

FIG. 19 shows a shaft body, and FIGS. 9(I) and (II) are longitudinal-sectional view and transverse-sectional view of the shaft body. FIG. 20 shows a state where magnet material is filled into a groove formed in the body, and FIGS. 20(I) and (II) are longitudinal-sectional view and transverse-sectional view of the shaft body filled with the magnet material. FIGS. 21, 22 and 23 are transverse-sectional views of respective embodiments for the magnet roll comprising a cylindrical main magnet and a shaft penetratingly inserted into the main magnet.

The shaft body 31 is formed with a groove 32 in a partial or whole body in its longitudinal direction, and magnet material 33 is filled into the groove 32. The shaft thus formed is penetratingly inserted into the cylindrical main magnet 34 to form a magnet roll. Another method may be adopted to secure the magnet material 33 to the shaft body 31. For example, a cut surface is formed in the shaft body 31, and an independently-formed longitudinal magnet member may be adhesively secured to the cut surface. In FIG. 20, the groove 32 is illustratively provided in the longitudinal direction of the shaft body 31 on only a portion of the shaft body 31 where the main magnet 34 is disposed. However, the groove 32 may be formed on the whole portion of the shaft body over its length.

The main magnet 34, the shaft body 31 and the magnet material 33 secured to the shaft body 31 will be hereunder described in detail.

Regarding the main magnet

Any one of "the extrusion molding in the presence of magnetic field for focus orientation" and "the method of multipolary magnetizing after extruding in the absence of magnetic field" may be selected to provide the outer peripheral surface of the main magnet with predetermined magnetic poles. The former is preferable because it provides a magnet roll having a greater magnetic property (surface magnetic flux density). However, since the latter can be easily carried out, the latter may be selected if a desired level of surface magnetic flux density is ensured. Particularly when a slender magnet roll or a thin magnet is required, the latter is recommended to be applied with magnetic powder having the high magnetization saturation such as magnetic powder of rapid quenched NdFeB based material.

Regarding the shaft body

Material used for the shaft body may be iron, aluminum, aluminum alloy, other metal, material obtained by molding powder of the above elements and then sintering them, material which is melted and then molded in a mold, material obtained by molding hard plastic (which may contain a reinforcing filler) etc. The shaft body may have any sectional profile insofar as a magnet for a shaft (hereinafter referred to as "shaft magnet") is secured thereto, and a circle with a cut surface, a circle with a groove, etc. may be adopted as the sectional profile. The cut surface, the groove, etc, are not necessarily formed over the length of the shaft body, and may be formed in correspondence to the length of the main magnet.

Regarding the magnet secured to the groove of the shaft

The material used for the main magnet is usable as magnet material of resin bonded magnet provided to the shaft body. The content of the magnetic material is determined in consideration of the magnetic property to be required, the kind of magnetic material powder, strength of the material when it is secured to the shaft, the molding performance, etc., and generally it is preferable in a range of 30 to 70 volume %. Any material may be used as synthetic resin serving as a binder insofar as it is usable for the resin bonded magnet, and various kinds of polyamide resin (so-called nylon group), polyethylene terephthalate, polyester, acrylic resin, polyphenylene sulfide (PPS), polyimide, liquid crystal polymer, phenol resin, epoxy resin, etc. may be used as the binder. Filler may be added to increase the mechanical strength. In addition, an additive for improving molding performance and a stabilizer for preventing deterioration of the resin may be suitably added.

The following method is usable to secure the shaft magnet into the shaft body.

(1) A method of adhesively securing to the shaft body the shaft magnet which is molded in predetermined size and shape by the injection molding or extrusion molding.

(2) A method of processing plastic bonded magnet molded by the injection molding or extrusion molding in predetermined size and shape so that it is usable as a shaft magnet, and then adhesively securing or filling the processed plastic bonded magnet (shaft magnet) to the shaft body.

(3) A method of securing to the shaft body a slender magnet fragment which is obtained by cutting a sheet magnet molded through a calendering process.

(4) A method of filling the shaft magnet into the groove of the shaft body by extruding the shaft body with melted resin magnet.

It is preferable that the magnetic particles of the shaft magnet are oriented in the presence of a magnetic field or by a mechanical shearing force in the molding process to improve the magnetic property (surface magnetic flux density). The shaft magnet oriented in the presence of a magnetic field may be used as it is, however, when the magnetization of the shaft magnet obstructs the fabrication of the magnet roll, the shaft magnet may be once demagnetized and secured to the shaft body, and then re-magnetized. A magnetizing process must be carried out to the shaft magnet which has been subjected to only a mechanical orientation process because it is not magnetized.

A DC power source, a condenser type of pulse power source or a magnetizer having a suitable magnetic circuit structure may be used to magnetize the shaft magnet.

The sectional shape of the whole shaft may be suitably designed so as to be round, rectangular, etc. and of these various sectional shapes, a round shape is more preferable. In this case, a cut surface, a groove or a projection may be singly or in combination provided to the shaft. The shaft must be so designed as to have the structure that it is supported by a rotatable support member at both sides thereof irrespective of the sectional shape of the shaft (including a case where another member is secured).

This invention is mainly intended to be applied to a slender magnet roll, however, this invention is also applicable to a case where the surface magnetic flux density of a specific magnetic pole or not only a slender magnet roll, but also a standard-diameter magnet roll is increased without reduction of the surface magnetic flux density of a counter magnetic pole.

Next, embodiments which have been conducted to ascertain the effect of this invention will be described. No limitation is imposed on this invention by these embodiments.

Embodiment 3-(1)

Regarding the shaft body

A U-shaped groove of 2 mm depth and 3 mm width was formed on a central portion of a round bar of aluminum-copper alloy (92Al, 8Cu) having 250 mm length, the central portion being the body portion of the round bar which has 220 mm length and excludes the both side portions of the round bar each of which extends from the side edge of the round bar to a position away from the side edge at 15 mm. The result was used as the shaft.

Regarding the magnet secured to the groove of the shaft

The composition as listed in table 1 was kneaded to form a pellet, and a sheet having 2 mm thickness was formed of the pellet by the calendering process. A magnet fragment of 219.5 mm length and 2.95 mm width was cut out from the sheet, and it was used as the shaft magnet.

Regarding the main magnet

The composition as listed in table 1 was kneaded to form a pellet, and a quadrupolary-magnetized main magnet (angular interval between magnetic poles was 90°) of 220 mm length which was partially provided with a cut surface was extruded in the presence of magnetic field with the pellet so as to have a cylindrical body of 10 $\phi$ in outer diameter and 6.03 mm in inner diameter.

Regarding the fabrication

The groove of the shaft body was coated with adhesive agent, and then the shaft magnet was embedded into the grove. The shaft body with the shaft groove was penetrated into the hollow of a main magnet to obtain a magnet roll. The surface magnetic flux density of each magnetic pole of the magnet roll thus obtained was measured by a Gauss meter to obtain a result indicated as "Embodiment 3-(1)" of a table 12. A magnet roll having an ordinary shaft (formed of iron and having no magnet) penetrated there into was formed as a comparative example, and the surface magnetic flux density of each magnetic pole of the magnet roll thus formed was measured to obtain a result indicated a "Comparative example 3-(1)" of table 12.

TABLE 12

| MAGNETIC POLE | SURFACE MAGNETIC FLUX DENSITY (GAUSS) | |
|---|---|---|
| | EMBODIMENT 3-(1) | COMP. EXAMPLE 3-(1) |
| N1 | 760 | 720 |
| S1 | 710 | 700 |
| N2 | 600 | 620 |
| S2 | 610 | 610 |

As is apparent from table 12, the surface magnet flux density of the main pole (N1 pole) of the magnet roll of this invention is more improved. However, the reduction of the surface magnetic flux density of the counter pole (N2 pole) is smaller, and the result of this invention is preferable.

Embodiment 3-(2)

Regarding the shaft body and the magnet secured to the groove of the shaft

A soft-iron (SS41) round bar of 6φ diameter and 250 mm length was formed with an U-shaped groove of 2.5 mm in maximum depth and 3 mm in width over its length, and the result was used as a shaft body. Subsequently, a pellet was formed of resin bonded magnet compound for injection molding which contained 90 weight % of strontium ferrite (OP71) produced by Nihon Bengara Co., Ltd. and a binder of nylon 12. The pellet was subjected to an insert injection molding with the shaft body to fill the resin bonded magnet into the U-shaped magnet. A magnetic field was applied during the injection molding to magnetize the resin bonded magnet in a direction perpendicular to its longitudinal direction and make the surface of the magnet an S-pole.

Regarding the main magnet

A quadrupolary-magnetized cylindrical longitudinal magnet (10 mm in outer diameter, 6.03 mm in inner diameter and 220 mm in length) having the interpole angles as listed in table 13 was extruded in the presence of magnetic field using the same composition as the "Embodiment 3-(1)", and the extruded result was used as a main magnet.

TABLE 13

| ANGULAR INTERVAL BETWEEN MAGNETIC POLES | |
|---|---|
| ∠S1-N1 | 120 Degree |
| ∠N1-S2 | 85 Degree |
| ∠S2-N2 | 80 Degree |
| ∠N2-S1 | 75 Degree |

Regarding the fabrication

The shaft as described above was inserted into the main magnet. At this time, the magnet side of the shaft was disposed so as to confront the S1-pole of the main magnet as shown in FIG. 23.

Comparative example 3-(2)

The composition as listed in table 1 was filled into an aluminum pipe of 6 mm outer diameter, 4 mm inner diameter and 250 mm length and then magnetized in its radial direction to form a shaft. The shaft was inserted into the same magnet as used in the "Embodiment 3-(2)" in such an arrangement that the surface magnetic flux density of the S1-pole was increased.

Experiment Result i) Measurement of surface magnetic flux density

The surface magnetic flux density of each pole of the magnet rolls of "Embodiment 3-(2)" and "Comparative Example 3-(2)" was measured by the Gauss meter, and the result is shown in a Table 14.

TABLE 14

| MAGNETIC POLE | SURFACE MAGNETIC FLUX DENSITY (GAUSS) | |
|---|---|---|
| | EMBODIMENT 3-(2) | COMP. EXAMPLE 3-(2) |
| S1 | 765 | 760 |
| N1 | 720 | 700 |
| S2 | 650 | 590 |
| N2 | 640 | 620 |

As is apparent from table 14, there is no large difference in surface magnetic flux density of the main pole (S1), however, there is a large difference in surface magnetic flux density of the S2 pole which is disposed away from the S1 pole at an angular interval of 155° in design. The surface magnetic flux density of the S2 pole of "Embodiment 3-(2)" is extremely higher than that of "Comparative Example 3-(2)". In addition, the peak position of the S2 pole of "Comparative Example 3-(2)" deviates greatly from a predetermined value in design, whereas the peak position of the S2 pole of "Embodiment 3-(2)" deviates little. The deviation of the peak position occurring after the insertion of the shaft is avoidable by magnetically designing the main magnet such that the peak position of the surface magnetic flux density thereof is beforehand deviated and its deviation is restored to a normal position when a shaft magnetic field is applied thereto. However, the accurate magnetic design is more difficult when the width to be beforehand deviated is large. According to this embodiment, the peak position of the surface magnetic field of the main magnet is hardly deviated, so that the design of the magnet roll can be easily made.

As described above, by using the shaft having the magnet at a part of its section, the surface magnetic flux density of only a desired magnetic pole can be increased. Therefore, according to this embodiment, a multipolary magnetized slender magnet roll in which the surface magnetic flux density of magnetic poles other than the desired magnetic pole is not affected by the increase of the surface magnetic flux density of the desired pole can be produced by the extrusion molding having high producibility. Accordingly, this invention contributes to the miniaturization and thinning of equipments using the electrophotographic technique such as the electronic copying machine, the facsimile, the LBP, etc.

A fourth embodiment will be next described with reference to the accompanying drawings.

Like the second and third embodiments, the fourth embodiment has an object of solving the "shaft problem" that the desired level of surface magnetic flux density can not be obtained on the surface of the magnet roll when a shaft having standard diameter is used for a slender magnet roll. In order to solve the "shaft problem," the second embodiment uses the pipe filled with the resin bonded magnet material, and the third embodiment uses the shaft having the magnet-filled groove on the surface thereof. On the other hand, the fourth embodiment uses a shaft provided with surface magnetic charge to solve the "shaft problem".

FIG. 24 is a prospective view of the external appearance of a magnet roll of the fourth embodiment. The magnet roll comprises a shaft 43 having a longitudinal body provided with surface magnetic charge, and a main magnet 41 disposed around the shaft 43. Embodiments of the main magnet 41 and the shaft 43 will be hereunder described.

Regarding the main magnet

Any one of "the extrusion molding in the presence of magnetic field for focus orientation" and "the method of multipolary magnetizing after extruding in the absence of magnetic field" may be selected to provide the outer peripheral surface of the main magnet with predetermined magnetic poles. The former is preferable because it provides a magnet roll having higher magnetic property (surface magnetic flux density). However, since the latter can be easily carried out, the latter may be selected if a desired level of surface magnetic flux density is ensured. Particularly when a slender magnet roll or a thin magnet roll is required, the latter is recommended to be applied with magnetic powder having high magnetization saturation such as magnetic powder of rapid quenched NdFeB based material.

Regarding the shaft

Resin bonded magnet is preferably used as shaft material. The same material as listed as the material of main magnet can be used as the magnetic material of the resin bonded magnet. The content of the magnetic material is determined in consideration of the magnetic property to be required, the kind of magnetic material powder, strength of the shaft when the shaft is formed of the material, the molding performance, etc., and generally it is preferable in a range of 30 to 70 volume %. Any material may be used as synthetic resin insofar as the mixture of the material and the magnetic powder provides sufficient strength, and various kinds of polyamide resin (so-called nylon group), polyethylene terephthalate, polyester, acrylic resin, polyphenylene sulfide (PPS), polyimide, liquid crystal polymer, bakelite, etc. may be used as the binder. Filler may be added to increase the mechanical strength. In addition, an additive for improving molding performance and a stabilizer for preventing deterioration of the resin may be suitably added.

Both of the injection molding process and the extrusion molding process are usable to produce a shaft of resin bonded magnet using magnetic material and synthetic resin. Use of the magnetic field orientation and the number of magnetic poles to be formed in the molding process may be determined on the basis of performance of a magnet roll to be required, and it is preferable that the shaft is dipolary magnetized in a section perpendicular to its longitudinal direction as shown in FIGS. 27(I), (II) and (III). When the shaft is dipolary magnetized in its transverse direction as described above, the magnetic field induced by the dipolary magnetized shaft extends to a farther position than the magnetic field of the magnet which is multipolary magnetized. Therefore, by adjusting the relative arrangement between the magnetization direction of the shaft and the magnetization direction of the main magnet disposed around the peripheral surface of the shaft and the relative arrangement thereof, the surface magnetic flux density of a specific magnetic pole is expected to be greatly increased. This invention has the main object of obtaining a slender magnet roll. However, the technique of promoting the increase of the surface magnetic flux density of the magnet roll by adjusting the relative arrangement between the magnetization direction of the shaft and the magnetization direction of the main magnet is generally usable as a technique of increasing the surface magnetic flux density of a specific magnetic pole of the magnet roll, and thus is also applicable to a magnet roll having a standard diameter.

A DC power source, a condenser type of pulse power source or a magnetizer having a suitable magnetic circuit structure may be used to magnetize the shaft molded in the absence of magnetic field.

The sectional shape of the whole shaft may be suitably designed so as to be round, rectangular, etc., and of these various sectional shapes, a round shape is more preferable. In this case, a projection 44 as shown in FIG. 25, a cut surface 45 as shown in FIG. 26(I), a V-shaped groove 47 or U-shaped groove 47 as shown in FIGS. 26(II) and (III) may be singly or in combination provided to the shaft. The shaft must be so designed as to have a structure so that it is supported by a rotatable support member at both sides thereof irrespective of the sectional shape of the shaft (including a case where another member is secured).

The shaft is penetrated into the main magnet by the following two methods. One method is that the main magnet and the shaft are independently formed, and then the shaft is penetrated into the main magnet, and the other method is that the main magnet material which has been heated and melted is extruded with the shaft using a cross head.

Next, embodiments which were conducted to ascertain the effect of this version of the invention will be described. No limitation is imposed on this invention by these embodiments.

Embodiment 4-(1)

Regarding the shaft

A pellet was formed of resin bonded compound containing 90% weight of strontium ferrite "OP71" produced by Nihon Bengara Co.. Ltd. and binder of nylon 12, and the pellet was subjected to the injection molding in the absence of magnetic field to obtain a round bar of 6 mm diameter and 250 mm length. Uniform magnetic field of 15 kOe was applied to the molded sample in a radial direction by an electromagnet to dipolary magnetize the sample.

Regarding the main magnet

The pellet formed of the composition of table 1 was subjected to the extrusion molding in the presence of magnetic field to form a cylindrical main magnet of 9.5 mm outer diameter, 6.05 mm in inner diameter and 220 mm length which has four magnetic poles. Thereafter, an adhesive agent was coated on the inner surface of the hollow of the main magnet, and then the shaft as described above was inserted into the hollow of the main magnet to form a magnet roll having interpeak angles of the radial magnetic field component of the surface magnetic flux density as listed in table 15.

TABLE 15

| ANGULAR INTERVAL BETWEEN MAGNETIC POLES | |
|---|---|
| ∠S1–N1 | 120 Degree |
| ∠N1–S2 | 85 Degree |
| ∠S2–N2 | 80 Degree |
| ∠N2–S1 | 75 Degree |

Comparative example 4-(1)

The pellet formed of the composition of table 1 was subjected to the extrusion molding in the presence of a magnetic field to obtain a focus-oriented quadrupolary-magnetized longitudinal magnet having 220 mm length, 9.5 mm outer diameter and 3.05 mm inner diameter. Thereafter, an adhesive agent was coated on the inner surface of the hollow of the magnet, and then a soft-iron (SS41) shaft of 3.0 mm outer diameter and 250 mm length was penetrated into the magnet. The interpeak values thereof are shown in Table 15 together with the "Embodiment 4-(1)."

Comparison between peak values of surface magnetic flux density

Plural magnet rolls were formed for each of the above two kinds of magnet rolls, and the peak value of surface magnetic flux density of each magnet roll was measured using a gauss meter (HGM8300) produced by ADS Co., Ltd. (hereinafter referred to as "ADS gauss meter") and a Hall Probe (FS-4). The results are shown in Table 16.

TABLE 16

| MAGNET POLE | SURFACE MAGNETIC FLUX DENSITY (GAUSS) | |
|---|---|---|
| | EMBODIMENT 4-(1) | COMP. EXAMPLE 4-(1) |
| S1 | 780–810 | 730–850 |
| N1 | 740–770 | 720–840 |
| S2 | 620–770 | 610–690 |
| N2 | 640–670 | 580–670 |

As is apparent from Table 16, "Comparative Example 4-(1)" has larger dispersion in surface magnetic flux density, and some samples were not usable because the surface magnetic flux density thereof was excessive low. On the other hand, "Embodiment 4-(1)" has small dispersion of surface magnetic flux density, and all of the samples were usable.

Comparison in core eccentricity

The core eccentricity of the central portion in the longitudinal direction of the magnet roll was measured with a laser while the magnet rolls of "Embodiment 4-(1)" and "Comparative Example 4-(1)" were rotated. The result is shown in Table 17.

TABLE 17

| | CORE ECCENTRICITY/mm |
|---|---|
| EMBODIMENT 4-(1) | 0.02–0.04 |
| COMP. EXAMPLE 4-(1) | 0.05–0.20 |

The reason for the large core eccentricity of "Comparative Example 4-(1)" is as follows. That is, many round bar shifts of 3 $\phi \times 250$ mm had been already bent before the fabrication, and when a product is stored in the form of a magnet roll while supported by a shipping pallet at both sides thereof, the product is liable to be bent due to its dead weight during a storage period. In addition, since the shaft orientation (the direction of the shaft on the cross section) when the shaft is penetrated into the main magnet 21 is dispersed every shaft, the core eccentricity of each magnetic pole is not fixed. These are the reasons why the magnetic flux density of the "Comparative Example 4-(1)" had large dispersion. On the other hand, the product of the "Embodiment 4-(1)", the core eccentricity of the shaft itself is small because the diameter of the shaft is large, and it is not bent after fabrication. Therefore, the magnetic flux density of the product of this invention had small dispersion.

Embodiment 4-(1)

The pellet as used as the shaft material in "Embodiment 4-(1)" was subjected to the injection molding using a metal mold applied with uniform magnetic field of 12 kOe to obtain a round bar shaft of 6 mm diameter and 250 mm length which was dipolary magnetized in its radial direction. The shaft thus formed was inserted to the same main magnet as used in "Embodiment 4-(1)" to obtain a magnet roll having the same interpeak angles of the radial component of the surface magnetic flux density as "Embodiment 4-(1)". The peak values of the surface magnetic flux density are shown in Table 18.

TABLE 18

| MAGNETIC POLE | SURFACE MAGNETIC FLUX DENSITY (GAUSS) |
|---|---|
| S1 | 840–860 |
| N1 | 780–810 |
| S2 | 590–620 |
| N2 | 650–680 |

The magnet roll of "Embodiment 4-(2)" has a smaller dispersion in surface magnetic flux density than "Embodiment 4-(1)" and enables the surface magnetic flux density of a specific pole to be increased. Particularly, the surface magnetic flux density of the S1 pole serving as the main pole is extremely higher than that of the "Comparative example 4-(1)" formed by the conventional method, and this is because the shaft was subjected to anisotropy and its magnetic property (surface magnetic flux density) was also increased.

Embodiment 4-(3)

A pellet was formed of resin bonded magnet compound containing 90.5% weight (66 volume %) of strontium ferrite (OP71) produced by Nihon Bengara Co., Ltd. and binder of nylon 12, and the pellet thus formed was inserted into a pipe having the same outer diameter, length and material as the shaft of the "Embodiment 4-(1)" by the injection molding machine. A permanent magnet (Sm-Co based sintered magnet) and a soft-iron yoke were disposed around the metal mold cavity to allow generation of a magnetic field having the distribution analogous to that of a magnetic field applied to the main magnet with four poles. Therefore, the shaft itself was formed as an anisotropic magnet having four magnetic poles.

The shaft which was filled with resin bonded magnet into the pipe body was extruded with the pellet formed of the composition of table 1 at a temperature of 140° C. to 150° C. in the presence of a magnetic field to obtain a quadrupolary-magnetized magnet roll having the same dimension and interpeak values of surface magnetic flux density as the magnet roll of "Embodiment 4-(1)." The direction of the magnetic field (four poles) induced by the extrusion die was set to the same direction as the magnetic field applied to the shaft. The core eccentricity of these magnet rolls was 0.035 to 0.060 mm, and there was no large difference between "Embodiment 4-(1)" and "Embodiment 4-(3)." The peak values of the surface magnetic flux density are shown in table 19, and these values are in usable range.

TABLE 19

| MAGNETIC POLE | SURFACE MAGNETIC FLUX DENSITY (GAUSS) |
|---|---|
| S1 | 820–830 |
| N1 | 810–825 |

TABLE 19-continued

| MAGNETIC POLE | SURFACE MAGNETIC FLUX DENSITY (GAUSS) |
|---|---|
| S2 | 670–690 |
| N2 | 680–700 |

Embodiment 4-(4)

As described above, this embodiment is applicable to not only a slender magnet roll, but also a thick magnet roll to increase the surface magnetic flux density of the specific magnetic pole. Here, in order to ascertain the effect of increasing the surface magnetic flux density, this embodiment was applied to a magnet roll having a larger outer diameter than the magnet rolls of "Embodiment 4-(1)" to "Embodiment 4-(3)" and four magnetic poles (N1, S1, N2 and S2) which perpendicularly intersected one another. That is, the pellet of the magnet compound which was used as the shaft material in "Embodiment 4-(1)" was subjected to the injection molding in the absence of a magnetic field to obtain a round bar of 6 mm diameter and 250 mm length. Thereafter, a uniform magnet field of 15 kOe was applied to the round bar in its radial direction to keep the round bar in the magnetization state as shown in FIG. 27(I), that is, to dipolary magnetize the round bar. The round bar thus formed was inserted into a main magnet (14 mm in outer diameter, 6.05 mm in inner diameter and 220 mm in length) which was extruded in the presence of quadrupolary magnetic field. In the insertion process, the N1-pole direction of the main magnet was coincident with the N-pole direction of the shaft, and adhesive agent was coated on the inner surface of the hollow of the main magnet to adhesively secure the shaft round bar to the main magnet, whereby a magnet roll was finally formed. The surface magnetic flux density of the magnet roll thus formed is shown in table 20. Similarly in "Embodiment 4-(4)," a magnet roll having a main magnet of 6.05 mm inner diameter and an iron shaft of 6 mm outer diameter which was inserted into the main magnet was prepared, and this magnet roll sample was used as "Comparative example 4-(4)." The surface magnetic flux density of "Comparative example 4-(4)" is also shown in table 20.

TABLE 20

| MAGNETIC POLE | SURFACE MAGNETIC FLUX DENSITY (GAUSS) | |
|---|---|---|
| | EMBODIMENT 4-(4) | COMP. EXAMPLE 4-(4) |
| N1 | 880 | 790 |
| S1 | 795 | 800 |
| N2 | 640 | 730 |
| S2 | 680 | 690 |

As shown in table 20, the surface magnetic flux density of the N1 pole serving as the main pole is greatly increased. On the other hand, the surface magnetic flux density of the N2 pole is decreased. However, this decrease does not obstruct the practical use because N2 pole is not the main pole. The shaft was injection-molded in the absence of magnetic field, and in this case a magnetic-field orientating equipment and a metal mold having a magnetic circuit structure are not required, so that the cost is reduced and the molding is easily perform.

As described above, by using the longitudinal shaft having surface magnetic charge, a multipolary magnetized slender magnet roll which is hardly sagged can be obtained without greatly decreasing the surface magnetic flux density. In addition, both of the injection molding and the extrusion molding can be adopted when the resin bonded magnet is used as a longitudinal material, and excellent producibility can be realized particularly when the injection molding is adopted. Therefore, this invention can contribute to the miniaturization and thinning of the equipment using the electrophotographic technique such as the electronic copying machine, the facsimile, the LBP, etc. Further, this invention is applicable to not only a slender magnet roll, but also a magnet roll having standard diameter and a thick magnet roll to increase the surface magnetic flux density of a specific magnetic pole.

A fifth embodiment has an object of obtaining a magnet roll capable of preventing the occurrence of the edge effect at the edge portion of the magnet roll and broadening its usable developing region, and also of proposing a shaft to attain the above object.

The principle of the fifth embodiment will be described with reference to the accompanying drawings. FIG. 28 shows the relationship between the magnet roll of this invention and the surface magnetic flux density distribution of the magnet roll, and FIG. 29 shows the relationship between the conventional magnet roll serving as a comparative example and the surface magnetic flux density distribution thereof. In FIGS. 28 and 29, a reference numeral 51 represents a main magnet, and a reference numeral 52 represents a shaft. In the magnet roll of this invention as shown in FIG. 28, a magnet shaft is used as the shaft. A surface magnetic charge is provided to the magnet shaft at a portion thereof having shorter length than the main magnet, and no surface magnetic charge is provided to the magnet shaft at portions thereof which correspond to both side portions of the main magnet. This state is shown by a distribution curve of surface magnetic flux density on the surface of the shaft which is represented by a reference numeral 54 in the figures.

On the other hand, in the magnet roll of the comparative example, there are two kinds of shafts used, one being a magnet shaft whose magnetized region is substantially coincident with the length of the main magnet while the other is an iron shaft which has not been magnetized. In FIG. 29, a distribution curve of surface magnetic flux density which is represented by a reference numeral 56 is relevant to the magnet roll using the magnet shaft whose magnetized region is substantially coincident with the length of the main magnet, and a distribution curve of surface magnetic flux density as represented by a reference numeral 57 is relevant to the magnet roll using the iron shaft which has not be magnetized. In FIG. 28, a curve as represented by a reference numeral 53 is a magnetic flux density distribution of the main magnet itself in its longitudinal direction, a curve as represented by a reference numeral 54 is a magnetic flux density distribution of the magnet shaft itself in its longitudinal direction, and a curve as indicated by a dotted chain line and represented by a reference numeral 55 is a magnetic flux density distribution of the magnet roll of this invention in which the magnet shaft is penetrated into the main magnet, as described above.

As shown by the magnetic flux density distribution curve 53, the magnetic flux density distribution of the main magnet itself, which is molded in the ordinary process, has higher edge portions due to the edge effect. Here, when the magnet roll is formed by penetrating into the main magnet, as described above, the magnet shaft having the surface magnetic flux density 54 to which a surface magnetic charge is provided at the portion thereof having shorter length that the main magnet, the magnetic flux density distribution curve of the magnet roll thus formed is lifted up only at the central portion thereof, as represented by a reference numeral 55, so that the region having the uniform magnetic flux density distribution is broadened and thus the developing region of the magnet roll is more broadened than the main magnet itself. As described above, according to this embodiment, the effective region in the main magnet is substantially broadened, and thus the length of the main magnet can be shortened to obtain a developing region of desired length.

The embodiments of this invention will be hereunder described in detail, however, this invention is not limited to the following embodiments.

Any one of "the extrusion molding in the presence of magnetic field for focus orientation" and "the method of multipolary magnetizing after extruding in the absence of magnetic field" may be selected to provide the outer peripheral surface of the main magnet with predetermined magnetic poles. The former is preferable because it provides a magnet roll having higher magnetic property (surface magnetic flux density). However, since the latter can be easily carried out, the latter may be selected if a desired level of surface magnetic flux density is ensured. Particularly when a slender magnet roll or a thin magnet roll is required, the latter is recommended to be applied with magnetic powder having high magnetization saturation such as magnetic powder of rapid quenched NdFeB based material. Alternatively, a method of performing magnetization of a desired number of magnetic poles after the extrusion molding in the presence of magnetic field for focus orientation may be selected.

The same resin bonded magnet material as used for the main magnet can be used as magnetic material of the shaft. The content of the magnetic material powder is determined in consideration of the magnetic property to be required, the kind of magnetic material powder, strength of the shaft when the shaft is formed of the material, the molding performance, etc., and generally it is preferable in a range of 30 to 70% volume. Any material may be used as resin insofar as the mixture of the material and the magnetic powder provides sufficient strength, and various kinds of polyamide resin (so-called nylon group), polyethylene terephthalate, polyester, acrylic resin, polyphenylene sulfide (PPS), polyimide, liquid crystal polymer, bakelite, etc. may be used as the binder. Filler may be added to increase the mechanical strength. In addition, an additive for improving molding performance and a stabilizer for preventing deterioration of the plastic may be suitably added.

Both of the injection molding and the extrusion molding are usable to produce a shaft of resin bonded magnet using magnetic material and resin. Use of the magnetic field orientation and the number of magnetic poles to be formed in the molding process may be determined on the basis of performance of a magnet roll to be required. Particularly when the shaft is penetratingly dipolary magnetized in a radial direction, the magnetic field induced by the magnetic poles extends to a farther position than that of the multipolary magnetized magnet. Therefore, the large increase of the surface magnetic flux density can be expected by adjusting the relative arrangement between the magnetization directions of the shaft and the main magnet of the magnet roll.

A permanent magnet, an electromagnet or other magnetizer having a suitable exciting source may be used to magnetize the shaft which is molded in the absence of a magnetic field.

The sectional shape of the whole shaft may be suitably designed so as to be round, rectangular, etc. In this case, a cut surface, a groove and a projection may be singly or in combination provided to the shaft to perform a positioning operation. The shaft must be so designed as to have the structure that it is supported by a rotatable support member at both sides thereof irrespective of the sectional shape of the shaft (including a case where another member is secured).

The whole shaft is not necessarily formed of magnet material such as resin bonded magnet material, and it may be formed of magnetic material such as SS41 material in a region other than a region requiring surface magnetic charge. In some cases, non-magnetic material such as aluminum is preferable. As a method of providing surface magnetic charge onto a predetermined region of the shaft may be adopted a method that the magnetization is conducted on only a predetermined region of the shaft which is molded with magnet material, or a method that a cut surface or groove is formed on a predetermined region of a normal shaft and magnet material is filled into the cut surface or groove to magnetized the predetermined region.

The region of the magnet shaft to be provided with surface magnet charge is dependent on the size of the main magnet, and it is preferably set to a region extending from a position away from each side edge of the main magnet by 1 mm to 5 mm to the central portion for the main magnet of 10 mm to 16 mm.

The embodiments of this invention will be next described in detail.

Embodiment 5-(1)

The pellet formed of the composition of Table 1 was extruded in the presence of a magnetic field to obtain a cylindrical main magnet with four magnetic poles with 16 mm outer diameter, 6.05 mm inner diameter and a length of 220 mm length.

Thereafter, a pellet was formed of a resin bonded magnet compound containing 90 weight % of strontium ferrite (OP71) produced by Nihon Bengara Co., Ltd., and binder of nylon 12, and the pellet was subjected to the injection molding in the absence of a magnetic field to obtain a round bar of 6 mm diameter and 250 mm length. A uniform magnetic field of 15 kOe was traversely applied to the longitudinal central region of 212 mm of the round bar by an electromagnet to dipolary magnetize the round bar, thereby obtaining the magnet shaft.

An adhesive agent was coated in the hollow center of the stain magnet, and then the magnet shaft thus formed was inserted into the hollow center. The magnetic flux density distribution of the magnet roll thus obtained was measured, and the result is shown in FIG. 28. The measurement was made at the position away from the rotational center at a distance of 9.5 mm. The developing region obtained at the position is shown in table 21. The portion of the magnet roll which corresponds to the developing region is illustrated as the effective region of the magnet roll.

Comparative Example 5-(1)

A magnetic flux density distribution curve 56 of FIG. 29 shows the measurement result of the surface magnetic flux density of a magnet roll in the longitudinal direction, which is obtained by performing the same processes as "Embodiment 5-(1)" except that the length of a magnetized region of the magnet shaft is set to 220 mm which is equal to the length of the main magnet. The developing region of the magnet roll is shown in table 21, and the region of the magnet roll which corresponds to the developing region is illustrated as the effective region.

Comparative Example 5-(2)

A magnetic flux density distribution curve 57 of FIG. 29 shows the measurement result of the surface magnetic flux density of the magnet roll in the longitudinal direction, which is obtained by performing the same processes as "Embodiment 5-(1)" except that a non-magnetized iron shaft is used. The developing region of the magnet roll is likewise shown in table 21, and the region of the magnet roll which corresponds to the developing region is illustrated as the effective region.

TABLE 21

|  | EMBODIMENT 5-(1) | COMP. EX. 5-(1) | COMP. EX. 5-(2) |
| --- | --- | --- | --- |
| EFFECTIVE LENGTH (mm) | 214 | 210 | 206 |

As is apparent from table 21, the magnet roll of "Embodiment 5-(1)" has a broader region having uniform surface magnetic flux density than the magnet rolls of "Comparative Example 5-(1)" and "Comparative Example 5-(2)." As described above, according to this embodiment, the magnet roll having a uniform magnetic flux density distribution in its longitudinal direction and a broad effective region can be produced.

As described above, according to the fifth embodiment, in the magnet roll using the magnet shaft which is partially or wholly formed of magnet material, the length of the magnet shaft to be provided with surface magnetic charge is set to be shorter than the length of the main magnet to depress the edge effect, so that the magnet roll has a broader effective region on which a developing operation can be carried out. Therefore, not only the magnet roll has uniform characteristics in its longitudinal direction, but also the actual length of the magnet roll can be shortened, thereby achieving miniaturization of an equipment to which the magnet roll is installed.

Next, a sixth embodiment will be described with reference to the accompanying drawings. The sixth embodiment prevents the following two undesirable phenomena which decrease the surface magnetic flux density of the magnet rolls: (a) decrease in the degree of magnetic particle orientation; and (b) deformation of the magnet roll.

Both (a) and (b) occur between t1 and t2, where t1 is the time at which the molded magnet roll has just gone out from an extrusion die and t2 is the time at which the magnet roll has been cooled and solidified. The time range t2–t1 is usually within one minute. For the time range, the extruded matter can be still easily deformed and the magnetic particles in the matter are still movable. Furthermore, the Maxwell stress works on the surface of any magnetized body and the self-demagnetizing field exists in any magnetized body.

The Maxwell stress deforms the molded magnet roll. The self-demagnetizing field causes the random reorientation of magnetic particles and thus decreases the whole degree of particle orientation in the magnet roll.

The sixth embodiment relates to "sizing mold" which can prevent the above phenomena (a) and (b). This mold has magnetic poles as elements of magnetic circuit structure which is nearly the same as the magnetic circuit structure of the extrusion die.

The mold is not always used with magnetizing sources such as permanent magnets, because the magnetic field from the extruded matter (a kind of permanent magnet) induces a new magnetic field from the magnetic poles of the mold. It is expected that the induced field can compensate for the self-demagnetizing field to a great extent.

Of course, it is more desirable to use the sizing mold with magnetizing sources, not only to ensure complete compensation but also to ensure a complete particle orientation state which has been generated in the extrusion die. In the embodiments, it is natural that the magnetic circuit of the sizing metal mold is so designed that the magnetic field distribution thereof is similar to the magnetic field distribution inside of the extrusion die, however, the similar structure is not necessarily required if the finally-required magnetic field pattern is obtainable. In addition, since the magnetic-field orientation is conducted by both of the extrusion die and the sizing metal mold, a time required for the magnetic-field orientation is necessarily extended. By performing the magnetic-field orientation for a predetermined time in the sizing metal mold, both of an unfavorable orientation state which unavoidably occurs due to the friction between the extrusion and the inner wall of the magnetic-field orienting die, and an orientation disturbance which occurs from the time when the extrusion is discharged from the die till the time when the extrusion is stored into the sizing metal mold can be depressed. Through these actions, the magnetic property (surface magnetic flux density) of the magnet roll can be improved.

The sectional shape of the main magnet is substantially cylindrical, however, a cut surface may be provided to perform a positioning operation or the like. In addition, the extrusion molding of the shaft with resin bonded material (insert extrusion molding) may be used to penetrate the shaft into the main magnet.

The extruded matter just after discharged from the die has a low-viscosity state. Therefore, a horizontal extrusion molding causes the extruded matter to be sagged and bent due to its dead weight, and its diameter is reduced, so that there is possibility that the extruded matter can not be stored into the sizing metal mold. The sagging of the extruded matter could be prevented if the viscosity of the extruded matter is high, however, in this case the motion of the magnetic particles is restricted to cause the orientation degree to be reduced. Therefore, the extruded matter is preferably subjected to the sizing with being kept at low viscosity. Accordingly, the extruded matter is preferably extruded in a vertical direction using a cross head die or the like.

Different versions of this embodiment will be now be described in detail.

Embodiment 6-(1)

In order to obtain a longitudinal cylindrical magnet roll of 14φ outer diameter and 220 mm in length with four magnetic poles, which has "predetermined values" of interpeak angles of radial component of surface magnetic flux density (hereinafter referred to as "surface magnetic flux density") as listed in table 23 and into which an iron shaft of 6φ (250 mm length) is penetrated, the pellet formed of the composition of table 1 was subjected to the molding process in accordance with the following procedure.

FIG. 30 is a schematic diagram of an apparatus used for a producing method of this invention. A reference numeral 61 represents a longitudinal cylindrical magnet, a reference numeral 62 represents an extrusion die in the presence of magnetic field, a reference numeral 63 represents a magnetic pole for magnetic field orientation, a reference numeral 64 represents a sizing metal mold, a reference numeral 65 represents an exciting permanent magnet, and a reference numeral 66 represents a magnetic-field generating yoke. An extrusion machine and a magnetic-field orienting apparatus are not shown. An arrow indicates a shift direction of the sizing metal mold. The producing processes of the magnet roll by the apparatus of this invention will be hereunder described.

(1) A shaft 67 having rotary shafts 67a of reduced diameter (FIG. 31) is extruded with melted resin magnet material of Table 1 using the cross head die. The length of the rotary shaft 67a is set to 15 mm, and thus the total length of the rotary shaft of the shaft is 30 mm (FIG. 32). Plural shafts are disposed so as to be confronted to one another through a rotary shaft, and a socket 68 is provided so as to completely surround both of the rotary shafts of respective neighboring shafts over the total length of the rotary shafts. Therefore, the plural shafts are linked to one another through the sockets which are disposed between the respective neighboring shafts. The plural shafts are supplied into the die while linked to one another in a line.

Figure 33:
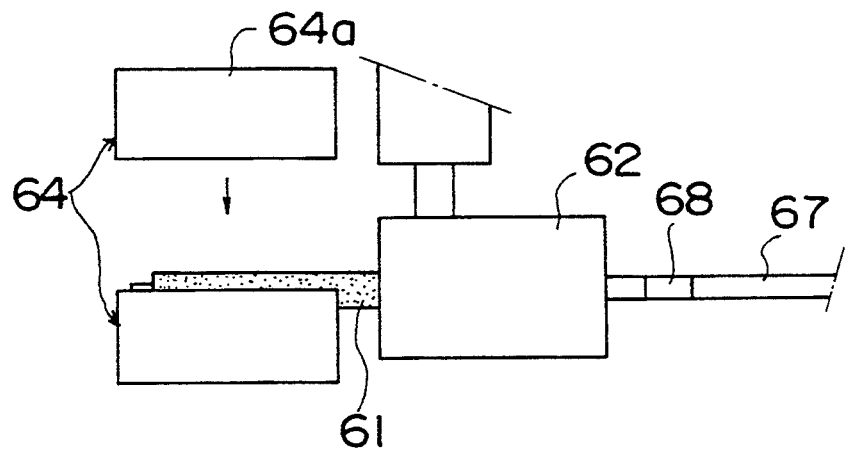

(2) An extruded matter is guided to a sizing metal mold 64 which is on stand-by in an opening state at a temperature below 80° C. and disposed at a position away from the end surface of the die by several centimeters. (FIG. 33)

Figure 34:
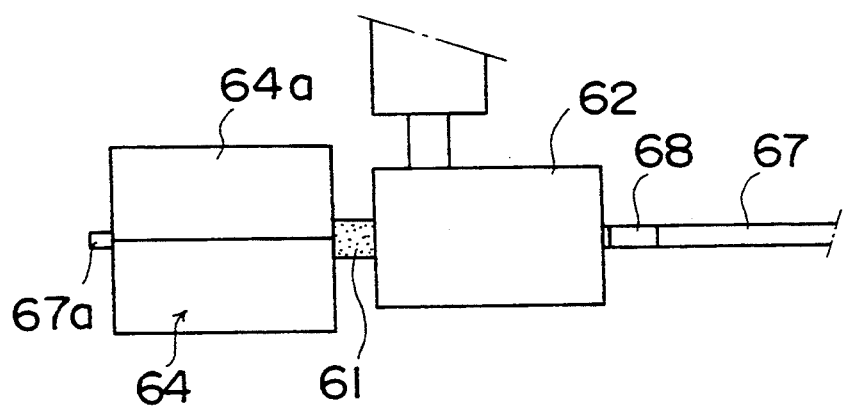

(3) The sizing metal mold 64 is rapidly closed when the magnet is guided to a predetermined position. (FIG. 34)

Figure 35:
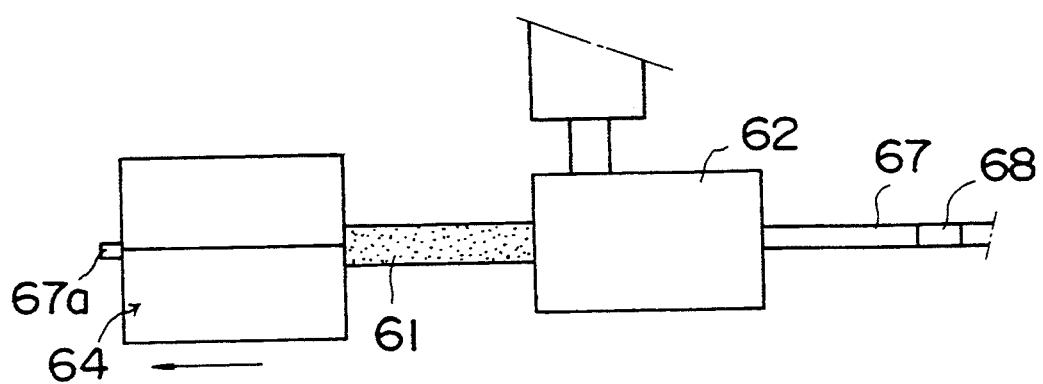

(4) The sizing metal mold 64 is moved by a horizontally moving mechanism (not shown) in an extrusion direction at a speed of 2.5 m/min which is substantially equal to an extrusion speed of the magnet. (FIG. 35)

Figure 36:
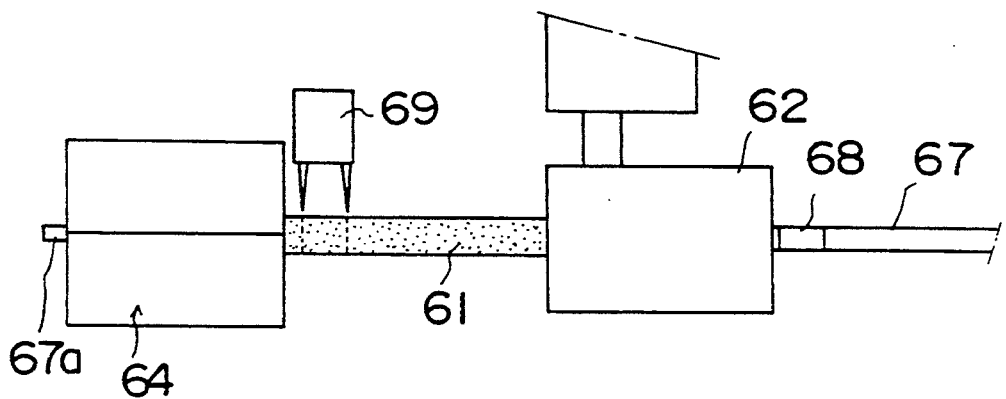
Figure 37:
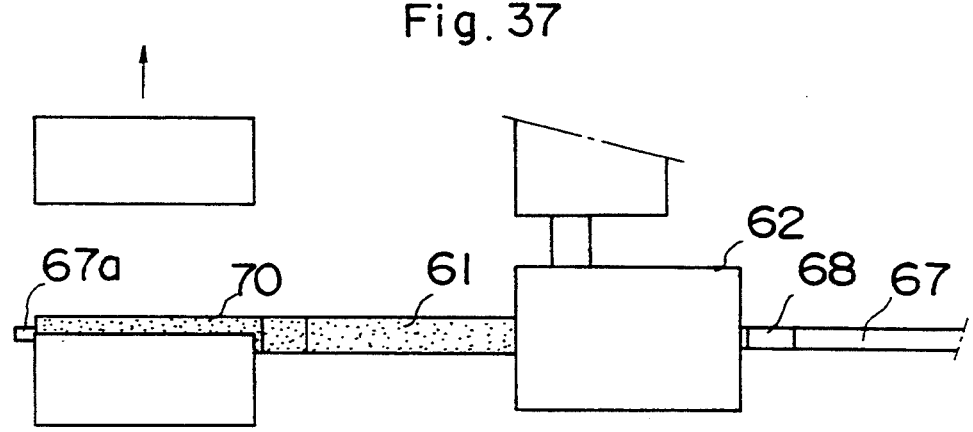

(5) When the temperature of the magnet is decreased below 90° C. and the magnet has enough rigidity to be cut, the magnet is cut out at the socket position by a cutter device 69 to obtain a predetermined length of magnet roll. (FIG. 36)

Figure 38:
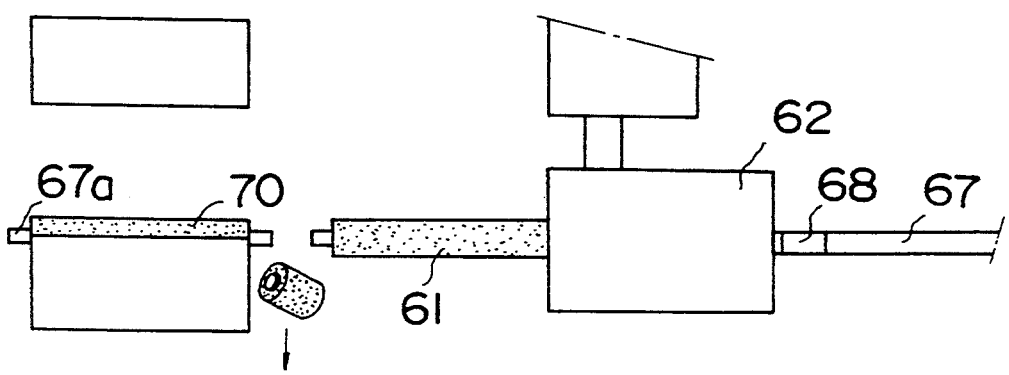
Figure 39:
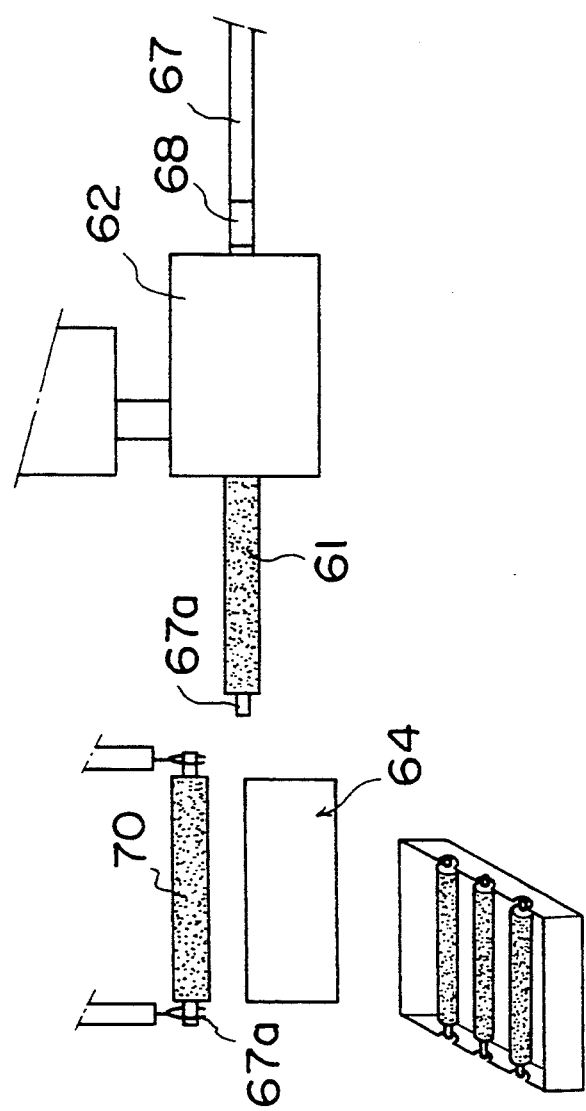

(6) Immediately after the cutting process, the upper side 64a of the sizing metal mold 64 is lifted up to open the sizing metal mold 64 (FIG. 37), and the socket 68 is removed to expose the rotary shaft portion 67a of the outside (FIG. 38). Thereafter, both ends of the shaft 67 are grasped to remove the magnet roll 70, and the removed magnet roll 70 is stored in a pallet. (FIG. 39).

Figure 40:
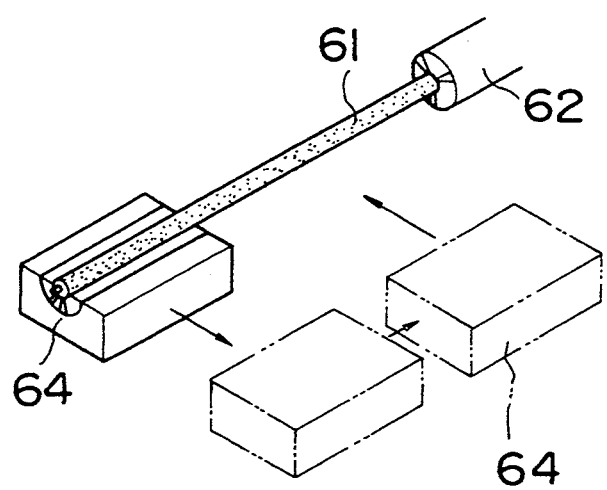

(7) The sizing metal mold 64 is moved in a direction perpendicular to the delivery direction while opened at the upper side thereof and is set into the horizontally moving mechanism movable in the opposite direction of the delivery direction to return the sizing metal mold to its initial position. (FIG. 40)

As not shown, plural sizing metal molds were used to improve the efficiency of producibility, and a source of magnetic field for each sizing metal mold was formed of SmCo based rare earth magnet. In this embodiment, natural cooling was sufficient to cool the sizing metal mold. Magnetomotive force applied to the electromagnet for magnetic-field orientation was 9000A.T (ampere turn) for the N1 pole and the S1 pole, and 3000A.T for the N2 pole and the S2 pole. The sectional shape of the magnet roll thus formed was substantially circular, and it was confirmed to be hardly deformed. The magnetic force (surface magnetic flux density) of each magnetic pole and deformation degree (maximum diameter/minimum diameter) are shown in table 22. Table 23 shows an angular interval between peak values of magnetic force (surface magnetic flux density) of the respective magnetic poles.

Comparative Example 6-(1)

The same pellet as "Embodiment 6-(1)" with the same shaft as "Embodiment 6-(1)" was subjected to the extrusion molding in the presence of magnetic field using no sizing metal mold to obtain a magnet roll. The sectional shape of the magnet roll thus obtained was deformed into a squarish shape due to projection of the magnetic pole portions. The magnetic force (surface magnetic flux density) of each magnetic pole and deformation degree of the magnet roll of this comparative example are shown in Table 22. The angular intervals between peak values of the surface magnetic flux density of respective magnetic poles are also shown in table 23.

TABLE 22

|  | SURFACE MAGNETIC FLUX DENSITY (UNIT:GAUSS) | | | | DEFORMATION DEGREE |
|---|---|---|---|---|---|
|  | N1 | S1 | N2 | S1 |  |
| EMBODIMENT 6-(1) | 880 | 870 | 710 | 695 | 1.01 |
| COMP. EXAMP. 6-(1) | 815 | 810 | 690 | 680 | 1.05 |

TABLE 23

|  | N1-S1 | S1-N2 | N2-S2 | S2-N1 |
|---|---|---|---|---|
| PREDETERMINED VALUE | 120 | 80 | 85 | 75 |
| EMBODIMENT 6-(1) | 119 | 79 | 86 | 76 |
| COMP. EXAMP 6-(1) | 115 | 83 | 89 | 73 |

As is apparent from tables 22 and 23, the magnet roll produced by the producing method of this embodiment has little deformation, high magnetic force (surface magnetic flux density), and those angular intervals between the magnetic poles which are hardly deviated from the predetermined values, and thus it is proved to be remarkably excellent.

As described above, a longitudinal cylindrical magnet roll having little deformation, high magnetic force (surface magnetic flux density) and those angular intervals between the magnetic poles which are hardly deviated from the predetermined values can be produced using a movable sizing metal mold by the extrusion molding having high producibility. Therefore, this embodiment can contribute to the promotion of high performance and low price of a magnet roll for use in an electrophotographic technique such as the electronic copying machine, the facsimile, the LBP, etc.

Next, a seventh embodiment will be described in detail with reference to the accompanying drawings. Like the sixth embodiment, the seventh embodiment has an object of solving the problem that the magnetic property (surface magnetic flux density) of a magnet roll is deteriorated due to disturbance or deterioration in degree of magnetic particle orientation until a molded material is cooled and solidified because of the difference in magnetic field distribution between the inside of the die and the outlet of the die or existence of magnetic Maxwell stress and self-demagnetizing field, and relates to the improvement of a sizing metal mold to attain the above object.

FIG. 41 is an explanatory diagram of the producing method of this invention. In FIG. 41, a reference numeral 71 represents a sizing metal mold, a reference numeral 72 represents a resin bonded magnet, a reference numeral 73 represents a heating device, and a reference numeral 74 represents a cooling device. A reference numeral 79 represents a heater serving as a heating source, a reference numeral 77 represents an exciting magnet, and a reference numeral 78 represents a cooling pipe into which cooling water is circulated. FIG. 42 is a perspective view of the sizing metal mold, FIG. 43 is an explanatory diagram of a magnet circuit of the heating device, and FIGS. 44 and 45 are explanatory diagrams of a magnetic circuit of the cooling device.

As shown in FIG. 42, the sizing metal mold comprises two or more separatable sub-units, and has a yoke structure having the substantially same magnetic-pole arrangement at the molding die in the presence of magnetic field. The heating device 73 has a sizing metal mold accommodating space 80 at the center thereof, and has a structure that a heater 79, a yoke 75 and an exciting electromagnet 77 are disposed around sizing metal mold accommodating space.

As the cooling device 74 may be used a device in which a yoke structure having the substantially same magnetic pole arrangement as the molding die in the presence of magnetic field is equipped with a cooling pipe 78 and thus which has no source magnetic field (FIG. 44), a device in which a yoke structure having an exciting permanent magnet 76 is equipped with a cooling pipe 78 as shown in FIG. 45, or the like. All cooling devices have at the center thereof a sizing metal mold accommodating space 81 capable of accommodating the sizing metal mold in which magnet material is supported.

According to this embodiment, the resin bonded magnet 72 which is molded by the magnetic-field orientation extruding machine is sandwiched by the sizing metal mold 71 having the resin bonded magnet 72 therein is installed into the heating device 73 where the resin bonded magnet 72 is supplied with magnetic field while heated. The resin bonded magnet 72 is softened with heat at the surface portion thereof, and magnetic particles which are allowed to move are re-oriented by the applied magnetic field. After a predetermined time elapses, the resin bonded magnet is moved together with the sizing metal mold to the cooling device. The magnetic particles which have been rearranged by the heating device are fixed by the magnetic circuit of the cooling device with no great disturbance and no deformation.

In the heating device, a magnetic field which is equal or approximate to the magnetic field for orientation in the extrusion molding is generated and applied to the resin bonded magnet, so that the re-orientation of the magnetic particles is promoted by the magnetic field thus generated. On the other hand, a source of the magnetic field is not necessarily required in the cooling device, and by providing a yoke structure formed of soft magnetic material to the magnetic pole portion of the molded product, the self-demagnetizing field can be offset by a mirror image effect of the yoke structure, so that the orientation disturbance can be prohibited. Of course, by providing a source of the magnetic field, the magnetic particles can be fixed by further strongly keeping the orientation state.

SS41, S25C, SUS410, permendur (FeCo alloy) or the like may be used as the metal mold yoke in this invention.

The different versions of this embodiment will be next described.

Embodiment 7-(1)

The pellet was formed of the composition of table 1 and was subjected to the extrusion molding in the presence of a magnetic field to obtain a cylindrical resin bonded magnet having am average outer diameter of 16 mm $\phi$. A shaft was inserted into the cylindrical resin bonded magnet thus obtained, and the cylindrical resin bonded magnet having the shaft therein was heated and cooled in the presence of a magnetic field in the processes as shown in FIG. 41.

The inner diameter of the sizing metal mold was set to 16 mm $\phi$, and SS41 and SUS 316 were used as magnetic material of a yoke portion and non-magnetic material of portions between the magnetic poles, respectively. The heating process was carried out at 160° C. for three minutes, and the same magnetic field as the molding magnetic field was applied during the heating process. The device having no source of magnetic field as shown in FIG. 44 was used as the cooling device, and the cooling process was carried out for two minutes. The peak value of the surface magnetic flux density of the magnet roll was measured at the position 19 mm $\phi$ away from the center of the magnet roll thus obtained, and the measurement result is shown in a Table 24.

Embodiment 7-(2)

A magnet roll was formed by carrying out the same processes as "Embodiment 7-(1)" except that a device having a source of magnetic field as shown in FIG. 45 was used as the cooling device, and the peak value of surface magnetic flux density of each magnetic pole of the magnet roll is shown in Table 24. A samarium-cobalt based sintered magnet was used as the source of magnetic field.

Comparative Example 7-(1)

A shaft was inserted into a molded sample obtained by the conventional extrusion molding in the presence of a magnetic field to obtain a magnet, and the peak value of surface magnetic flux density of each magnetic pole of the magnet roll is shown in the Table 24.

Comparative Example 7-(2)

A shaft was inserted into a molded sample obtained by the conventional extrusion molding in the presence of a magnetic field, and the result was subjected to pulse magnetization to obtain a magnet roll. The peak value of surface magnetic flux density of each magnetic pole of the magnet roll is shown in Table 24.

TABLE 24

|  | S1 | N1 | S2 | N2 |
| --- | --- | --- | --- | --- |
| EMBODIMENT 7-(1) | 910 | 905 | 760 | 750 |
| EMBODIMENT 7-(2) | 925 | 920 | 780 | 775 |
| COMP. EXAMP. 7-(1) | 855 | 845 | 690 | 710 |
| COMP. EXAMP. 7-(2) | 880 | 885 | 705 | 715 |

As is apparent from table 24, the producing method of this embodiment can provide a resin bonded magnet having more improved surface magnetic flux density in comparison with the conventional comparative examples.

As described above, according to this embodiment, in the process of producing a magnet roll of resin bonded magnet, the magnet roll is heated and cooled in the presence of magnetic field while accommodated in the sizing metal mold after the molding process in the presence of magnetic field. This process increases the degree of the orientation of particles which are distributed in the region near the surface of the magnet roll, and then leaves the magnet roll with remarkably improved surface magnetic flux density. Therefore, the yield of products is improved, and pattern control of surface magnetic flux density distribution can be facilitated, so that the degree of freedom for development of products is improved.

An eighth embodiment will next be described. There are some cases where the extruded matter obtained by the first to seventh embodiments is demagnetized and the re-magnetized, or re-magnetized without a demagnetizing process. The purpose of the re-magnetizing process is to make the final pattern of the surface magnetic field of the magnet roll. The eighth embodiment relates to the re-magnetizing process.

FIGS. 46 (I) and (II) are schematic diagrams of examples of the magnetizers used in this invention. The magnetizer shown in FIG. 46 (I) is used for the first magnetizing process and the magnetizer shown in FIG. 46 (II) is used for the second magnetizing process. FIG. 47 (I) is a schematic diagram showing a distribution of the magnetic field vectors in the first magnetizing process. FIG. 47 (II) is a schematic diagram which shows a distribution of the magnetization vectors generated after the first magnetizing process. FIG. 48 (I) shows the distribution of the magnetic field vectors in the second magnetization process. FIG. 48 (II) shows the distribution of the magnetization vectors generated by the second magnetizing operation which is done after the first magnetizing process. A reference numeral 91 represents a magnetic yoke for forming a main magnetic pole, a reference numeral 92 represents a magnetic yoke, a reference numeral 93 represents an exciting coil, reference numeral 94 represents a magnet roll, and a reference numeral 95 represents a shaft which is penetrated into the magnet roll in its longitudinal direction. A crosshatching is eliminated in the figures.

As shown in the figures, the first magnetizing is carried out with two magnetic poles, and through the first magnetizing the magnet roll is magnetized to the inner portion thereof. Thereafter, the magnet roll is re-magnetized at the surface portion thereof with four magnetic poles whole number is a finally-required number of magnetic poles, thereby obtaining a magnet roll 94 which is sufficiently magnetized to the inner portion thereof and has a desired number of magnetic poles.

In this embodiment, the requisite number of magnetic poles is four, and the first magnetizing process (preliminary magnetization process) is carried out with two magnetic poles. However, the number of magnetic poles is not limited to the above.

This embodiment will be further described on the basis of the following versions of the embodiment thereof, however, no imitation is imposed on this embodiment by these versions.

SS41, S25C, SUS410, permendur (FeCo alloy) may be used as material of the magnetizer used in this invention.

This embodiment is very effectively used in a case where magnetic force (surface magnetic flux density) is provided to an isotropic magnet, and also in a case where a magnet which is magnetized for orientation in the molding process is further magnetized to increase the surface magnetic flux density thereof.

Next, this embodiment will be described on the basis of the versions of the embodiment thereof.

Embodiment 8-(1)

Soft vinyl chloride based resin compound containing 50% volume of neodymium-iron-boron based isotropic magnetic powder was subjected to the extrusion molding to obtain a magnet roll of 16 mm. The magnet roll thus formed was dipolary magnetized with the magnetizer as shown in FIG. 46(I), and then quadrupolary re-magnetized with the magnetizer as shown in FIG. 46(II). The peak value of surface magnetic flux density was measured at a position away from the center of the magnet roll by 19 mm $\phi$. The measurement result is shown in table 25.

Embodiment 8-(2)

Soft vinyl chloride based compound containing 65% volume of strontium ferrite anisotropic magnetic powder was subjected to the extrusion molding to obtain a quadrupolary magnetized magnet roll. The magnet roll thus formed was dipolary magnetized with the magnetizer as shown in FIG. 46(I), and then quadrupolary re-magnetized with the magnetizer as shown in FIG. 46(II). The peak value of surface magnetic flux density of the magnet roll is shown in table 25.

Comparative Example 8-(1)

The same magnet roll as "Embodiment 8-(2)" was magnetized only once with the magnetizer as shown in FIG. 46(II). The measurement result of the peak value of surface magnetic flux density of the magnet roll is also shown in Table 25.

Comparative Example 8-(2)

A magnet roll was formed in the same process as "Embodiment 8-(2)" except that the compound was dipolary (not quadrupolary) uniformly magnetized in the presence of magnetic field in the molding process. The magnet roll thus formed was magnetized only once with the magnetizer as shown in FIG. 46(II). The measurement result of the peak value of surface magnetic flux density of the magnet roll is also shown in Table 25.

TABLE 25

|  | S1 | N1 | S2 | N2 |
|---|---|---|---|---|
| EMBODIMENT 8-(1) | 895 | 860 | 620 | 640 |
| EMBODIMENT 8-(2) | 890 | 845 | 610 | 650 |
| COMP. EXAMP. 8-(1) | 855 | 835 | 650 | 645 |
| COMP. EXAMP. 8-(2) | 900 | 605 | 615 | 600 |

(unit:gauss)

As is apparent from the Table 25, the magnet rolls of "Embodiment 8-(1)" and "Embodiment 8-(2)" can be magnetized to the further inner part of the magnet body in comparison with the magnet rolls of "Comparative Example 8-(1)" and "Comparative Example 8-(2)", and the magnet roll having the improved surface magnetic flux density of the S1 pole serving as the main magnetic poke can be obtained.

As described above, according to this embodiment, the preliminary magnetization is carried out with magnetic poles whose number is smaller than a finally-required number of magnetic poles to increase the surface magnetic flux density of a specific magnetic pole, and then the re-magnetization is carried out with the finally-required number of magnetic poles. Through such a magnetizing method, the magnet body can be magnetized to the inner portion thereof, and a magnet roll having the improved surface magnetic flux density can be obtained. Therefore, the magnetic property (surface magnetic flux density) of only the specific pole can be improved.

What is claimed is:

1. A method of producing a magnet roll comprising the steps of:

pressing resin bonded magnet material obtained by dispersing and mixing ferromagnetic material powder having magnetic anisotropy into synthetic resin into a die by an extruding machine while the resin bonded magnet material is heated and melted, thereby performing a molding in the presence of magnetic field;

storing an extruded matter discharged from the die into a sizing metal mold having a magnetic circuit structure and moving the extruded matter together with the sizing metal mold in a delivery direction of the extrusion while the extruded matter is stored in the sizing metal mold;

cutting out the extruded matter by a predetermined length and separating the cut-out extruded matter from the sizing metal mold;

returning the sizing metal mold to a stand-by position thereof while cooling the sizing metal mold after the extruded matter is separated; and repeating a series of the pressing step, the storing step, the moving step, the cutting step and the returning step.

2. A method of producing a magnet roll comprising the steps of:

subjecting resin magnet material obtained by dispersing and mixing ferromagnetic material powder having magnetic anisotropy in thermoplastic resin to an extrusion molding in the presence of a magnetic field;

heating the extruded matter in the presence of magnetic field in a sizing metal mold; and cooling the extruded matter in the presence of magnetic field in the sizing metal mold.

3. The method as recited in claim 2, wherein said heating step in the presence of the magnetic field and said cooling step in the presence of the magnetic field in the sizing metal mold are carried out while the extruded matter is accommodated together with the sizing metal mold storing the extruded matter therein in one of a heating device or cooling device.

4. The method as recited in claim 2, wherein said sizing metal mold has substantially the same magnetic-pole structure as the magnetic-field orienting die.

5. A method for producing a magnet roll which is peripherally magnetized so as to have three or more magnetic poles, comprising the steps of:

carrying out molding in the presence of a magnetic field so as to have magnetic poles whose number is identical with a required number of magnetic poles;

carrying out magnetization with magnetizing equipment having a smaller number of poles than the required number of magnetic poles; and carrying out magnetization with magnetizing equipment having the required number of magnetic poles.

6. A method of producing a magnet roll, comprising the following steps:

performing an extrusion molding to obtain a cylindrical magnet roll using an extrusion die in the presence of a magnetic field, wherein the magnet roll has a structure in which a ferromagnetic material portion and a non-magnetic material portion are arranged around a land in a peripheral direction of the land in an alternating manner; and varying the cross-sectional shape of the ferromagnetic material portion in the direction of extrusion.

* * * * *